US012743745B2

(12) United States Patent
Ren et al.

(10) Patent No.: US 12,743,745 B2
(45) Date of Patent: Sep. 22, 2026

(54) GENERATING DIGITAL IMAGES UTILIZING A DIFFUSION-BASED NETWORK CONDITIONED ON LIGHTING-AWARE FEATURE REPRESENTATIONS

(71) Applicant: Adobe Inc., San Jose, CA (US)

(72) Inventors: Mengwei Ren, San Jose, CA (US); He Zhang, San Jose, CA (US); Wei Xiong, San Jose, CA (US); Zhixin Shu, San Jose, CA (US); Jae Shin Yoon, San Jose, CA (US); Jianming Zhang, Campbell, CA (US)

(73) Assignee: Adobe Inc., San Jose, CA (US)

( * ) Notice: Subject to any disclaimer, the term of this patent is extended or adjusted under 35 U.S.C. 154(b) by 119 days.

(21) Appl. No.: 18/640,429

(22) Filed: Apr. 19, 2024

(65) Prior Publication Data

US 2025/0328987 A1 Oct. 23, 2025

(51) Int. Cl.
*G06T 5/50* (2006.01)
*G06T 5/77* (2024.01)
(Continued)

(52) U.S. Cl.
CPC .................. *G06T 5/50* (2013.01); *G06T 5/77* (2024.01); *G06V 10/56* (2022.01); *G06V 10/60* (2022.01);
(Continued)

(58) Field of Classification Search
CPC ... G06T 5/50; G06T 5/77; G06T 2207/20084; G06T 2207/20221; G06V 10/56; G06V 10/60; G06V 10/771; H04N 5/272
See application file for complete search history.

(56) References Cited

U.S. PATENT DOCUMENTS

2021/0065339 A1* 3/2021 Cheon .................... G09G 5/005
2023/0037591 A1* 2/2023 Villegas ................ G06T 15/506
2023/0289989 A1* 9/2023 Yang ...................... G06T 7/557

OTHER PUBLICATIONS

Li et al., Image Harmonization with Diffusion Model, submitted on Jun. 17, 2023, downloaded from https://arxiv.org/abs/2306.10441 on Oct. 9, 2025. 8 pages. (Year: 2023).*

(Continued)

*Primary Examiner* — Haixia Du
(74) *Attorney, Agent, or Firm* — Keller Preece PLLC

(57) ABSTRACT

Methods, systems, and non-transitory computer readable storage media are disclosed for generating digital images with a diffusion-based generative neural network conditioned on background-extracted lighting features. The disclosed system determines, in response to a request to generate a digital image, a target background image for inserting a foreground object into the target background image. The disclosed system generates, from the target background image and utilizing a lighting conditioning neural network, a lighting feature representation indicating one or more lighting parameters of the target background image. Additionally, the disclosed system generates, utilizing a diffusion-based generative neural network conditioned on the lighting feature representation, the digital image including the foreground object inserted into the target background image based on a composite image comprising the foreground object and the target background image with a foreground mask corresponding to the foreground object.

20 Claims, 16 Drawing Sheets

(51) Int. Cl.
*G06V 10/56* (2022.01)
*G06V 10/60* (2022.01)
*G06V 10/771* (2022.01)
*H04N 5/272* (2006.01)

(52) U.S. Cl.
CPC .......... *G06V 10/771* (2022.01); *H04N 5/272* (2013.01); *G06T 2207/20084* (2013.01); *G06T 2207/20221* (2013.01)

(56) References Cited

OTHER PUBLICATIONS

Ren et al., Relightful Harmonization: Lighting-aware Portrait Background Replacement, submitted on Dec. 11, 2023, revised on Apr. 7, 2024, downloaded from https://arxiv.org/abs/2312.06886v2. 26 pages. (Year: 2024).*

Adam Paszke, Sam Gross, Francisco Massa, Adam Lerer, James Bradbury, Gregory Chanan, Trevor Killeen, Zeming Lin, Natalia Gimelshein, Luca Antiga, et al. "PyTorch: An Imperative Style, High-Performance Deep Learning Library". Advances in Neural Information Processing Systems, (NeurIPS) 32, 12 pages, Dec. 2019.

Aditya Ramesh, Prafulla Dhariwal, Alex Nichol, Casey Chu, and Mark Chen. "Hierarchical Text—Conditional Image Generation with CLIP Latents". arXiv preprint arXiv:2204.06125v1, Apr. 13, 2022.

Alex Nichol, Prafulla Dhariwal, Aditya Ramesh, Pranav Shyam, Pamela Mishkin, Bob McGrew, Ilya Sutskever, and Mark Chen. "Glide: Towards Photorealistic Image Generation and Editing with Text-Guided Diffusion Models". arXiv preprint arXiv:2112.10741v2, Dec. 22, 2021.

Amir Hertz, Ron Mokady, Jay Tenenbaum, Kfir Aberman, Yael Pritch, and Daniel Cohen-Or. "Prompt-to-Prompt Image Editing with Cross Attention Control". arXiv preprint arXiv:2208.01626v1, Aug. 2, 2022.

Bahjat Kawar, Jiaming Song, Stefano Ermon, and Michael Elad. "JPEG Artifact Correction using Denoising Diffusion Restoration Models". arXiv preprint arXiv:2209.11888v2, Nov. 23, 2022.

Bahjat Kawar, Michael Elad, Stefano Ermon, and Jiaming Song. "Denoising Diffusion Restoration Models". 36th Conference on Neural Information Processing Systems (NeurIPS), Jan. 2022.

Bahjat Kawar, Roy Ganz, and Michael Elad. "Enhancing Diffusion-Based Image Synthesis with Robust Classifier Guidance". arXiv preprint arXiv:2208.08664v1, Aug. 18, 2022.

Bram Wallace, Akash Gokul, and Nikhil Naik. "EDICT: Exact Diffusion Inversion via Coupled Transformations". arXiv preprint arXiv:2211.12446v2, Dec. 22, 2022.

Chen Henry Wu and Fernando De la Torre. "A Latent Space of Stochastic Diffusion Models for Zero-Shot Image Editing and Guidance". In Proceedings of the IEEE/CVF International Conference on Computer Vision (ICCV), pp. 7378-7387, 2023.

Chenlin Meng, Yang Song, Jiaming Song, Jiajun Wu, Jun-Yan Zhu, and Stefano Ermon. "SDEdit: Image Synthesis and Editing with Stochastic Differential Equations". arXiv preprint arXiv:2108.01073v1, Aug. 2, 2021.

Chitwan Saharia, William Chan, Huiwen Chang, Chris Lee, Jonathan Ho, Tim Salimans, David Fleet, and Mohammad Norouzi. "Palette: Image-to-Image Diffusion Models". In ACM SIGGRAPH 2022 Conference Proceedings, pp. 1-10, Aug. 2022.

Chitwan Saharia, William Chan, Saurabh Saxena, Lala Li, Jay Whang, Emily Denton, Seyed Kamyar Seyed Ghasemipour, Burcu Karagol Ayan, S Sara Mahdavi, Rapha Gontijo Lopes, et al. "Photorealistic Text-to-Image Diffusion Models with Deep Language Understanding". arXiv preprint arXiv:2205.11487v1, May 23, 2022.

Daiki Miyake, Akihiro Iohara, Yu Saito, and Toshiyuki Tanaka. "Negative-prompt Inversion: Fast Image Inversion for Editing with Text-guided Diffusion Models". arXiv preprint arXiv:2305.16807v1, May 26, 2023.

Gihyun Kwon and Jong Chul Ye. "Diffusion-Based Image Translation Using Disentangled Style and Content Representation". arXiv preprint arXiv:2209.15264v1, Sep. 30, 2022.

Guillaume Couairon, Jakob Verbeek, Holger Schwenk, and Matthieu Cord. "DiffEdit: Diffusion-Based Semantic Image Editing with Mask Guidance". arXiv preprint arXiv:2210.11427v1, Oct. 20, 2022.

Hao Zhou, Sunil Hadap, Kalyan Sunkavalli, and David W Jacobs. "Deep Single-Image Portrait Relighting". In Proceedings of the IEEE/CVF International Conference on Computer Vision (ICCV), pp. 7194-7202, Oct. 2019.

Haoying Li, Yifan Yang, Meng Chang, Shiqi Chen, Huajun Feng, Zhihai Xu, Qi Li, and Yueting Chen. "SRDiff: Single Image Super-Resolution with Diffusion Probabilistic Models". Neurocomputing, 479:47-59, Mar. 28, 2022.

He Zhang, Jianming Zhang, Federico Perazzi, Zhe Lin, and VishalM. Patel. "Deep Image Compositing". In Proceedings of the IEEE/CVF Winter Conference on Applications of Computer Vision (WACV), pp. 365-374, 2021.

Hiroshi Sasaki, Chris G Willcocks, and Toby P Breckon. "UNIT-DDPM: Unpaired Image Translation with Denoising Diffusion Probabilistic Models". arXiv preprint arXiv:2104.05358v1, Apr. 12, 2021.

Inbar Huberman-Spiegelglas, Vladimir Kulikov, and Tomer Michaeli. "An Edit Friendly DDPM Noise Space: Inversion and Manipulations". arXiv preprint arXiv:2304.06140v2, Apr. 14, 2023.

Jascha Sohl-Dickstein, Eric Weiss, Niru Maheswaranathan, and Surya Ganguli. "Deep Unsupervised Learning using Nonequilibrium Thermodynamics". In International Conference on Machine Learning (PMLR), pp. 2256-2265, Jul. 2015.

Jeya Maria Jose Valanarasu, He Zhang, Jianming Zhang, Yilin Wang, Zhe Lin, Jose Echevarria, Yinglan Ma, Zijun Wei, Kalyan Sunkavalli, and Vishal M Patel. "Interactive portrait Harmonization". arXiv preprint arXiv:2203.08216v1, Mar. 16, 2022.

Jiaming Song, Chenlin Meng, and Stefano Ermon. "Denoising Diffusion Implicit Models". In International Conference on Learning Representations, p. 1-20, 2021.

Jiangi Chen, Yilan Zhang, Zhengxia Zou, Keyan Chen, and Zhenwei Shi. "Dense Pixel-to-Pixel Harmonization via Continuous Image Representation". IEEE Transactions on Circuits and Systems for Video Technology, May 2024.

Jianqi Chen, Zhengxia Zou, Yilan Zhang, Keyan Chen, and Zhenwei Shi. "Zero-Shot Image Harmonization with Generative Model Prior", arXiv preprint arXiv:2307.08182v1, Jul. 17, 2023.

Jingtang Liang, Xiaodong Cun, and Chi-Man Pun. "Spatial-Separated Curve Rendering Network for Efficient and High-Resolution Image Harmonization". arXiv preprint arXiv:2109.05750v4, Nov. 30, 2021.

Jonathan Ho and Tim Salimans. "Classifier-Free Diffusion Guidance". In NeurIPS 2021 Workshop on Deep Generative Models and Downstream Applications, 2021.

Jonathan Ho, Ajay Jain, and Pieter Abbeel. "Denoising Diffusion Probabilistic Models". 34th Conference on Neural Information Processing Systems (NeurIPS), 33:6840-6851, Dec. 2020.

Jonathan Ho, Tim Salimans, Alexey Gritsenko, William Chan, Mohammad Norouzi, and David J Fleet. "Video Diffusion Models". arXiv:2204.03458v2, Jun. 22, 2022.

Julian Jorge Andrade Guerreiro, Mitsuru Nakazawa, and Bjorn Stenger. "PCT-Net: Full Resolution Image Harmonization Using Pixel-Wise Color Transformations". In Proceedings of the IEEE/CVF Conference on Computer Vision and Pattern Recognition (CVPR), pp. 5917-5926, Jun. 2023.

Jun-Yan Zhu, Philipp Krahenbuhl, Eli Shechtman, and Alexei A Efros. "Learning a Discriminative Model for the Perception of Realism in Composite Images". In Proceedings of the IEEE International Conference on Computer Vision, pp. 3943-3951, Dec. 2015.

Ke Wang, Michael Gharbi, He Zhang, Zhihao Xia, and Eli Shechtman. "Semi-supervised Parametric Real-world Image Harmonization". In Proceedings of the IEEE/CVF Conference on Computer Vision and Pattern Recognition (CVPR), pp. 5927-5936, Jun. 2023.

(56) References Cited

OTHER PUBLICATIONS

Li Niu, Junyan Cao, Wenyan Cong, and Liqing Zhang. "Deep Image Harmonization with Learnable Augmentation". In Proceedings of the IEEE/CVF International Conference on Computer Vision, pp. 7482-7491, Aug. 2023.
Lingxiao Lu, Jiangtong Li, Junyan Cao, Li Niu, and Liqing Zhang. "Painterly Image Harmonization using Diffusion Model". In Proceedings of the 31st ACM International Conference on Multimedia. ACM, pp. 1-15, arXiv preprint arXiv:2308.02228V1, Aug. 4, 2023.
Longwen Zhang, Qixuan Zhang, Minye Wu, Jingyi Yu, and Lan Xu. "Neural Video Portrait Relighting in Real-Time via Consistency Modeling". EEE/CVF International Conference on Computer Vision (ICCV), pp. 802-812, Oct. 2021.
Lvmin Zhang, Anyi Rao, and Maneesh Agrawala. "Adding Conditional Control to Text-to-Image Diffusion Models". In Proceedings of the IEEE/CVF International Conference on Computer Vision, pp. 3836-3847, Oct. 2023.
Manuel Brack, Felix Friedrich, Dominik Hintersdorf, Lukas Struppek, Patrick Schramowski, and Kristian Kersting. SEGA: Instructing Diffusion using Semantic Dimensions. arXiv preprint arXiv:2301.12247v1, Jan. 28, 2023.
Mengwei Ren, Mauricio Delbracio, Hossein Talebi, Guido Gerig, and Peyman Milanfar. "Multiscale Structure Guided Diffusion for Image Deblurring". In Proceedings of the IEEE/CVF International Conference on Computer Vision (ICCV), pp. 10721-10733, Oct. 2023.
Min Zhao, Fan Bao, Chongxuan Li, and Jun Zhu. "EGSDE: Unpaired Image-to-Image Translation via Energy-Guided Stochastic Differential Equations". In Advances in Neural Information Processing Systems (NeurIPS), 35:3609-3623, Jul. 2022.
Mingdeng Cao, Xintao Wang, Zhongang Qi, Ying Shan, Xiaohu Qie, and Yinqiang Zheng. "MasaCtrl: Tuning-Free Mutual Self-Attention Control for Consistent Image Synthesis and Editing". arXiv preprint arXiv:2304.08465v1, Apr. 17, 2023.
Narek Tumanyan, Michal Geyer, Shai Bagon, and Tali Dekel. "Plug-and-Play Diffusion Features for Text-Driven Image-to-Image Translation". In Proceedings of the IEEE/CVF Conference on Computer Vision and Pattern Recognition (CVPR), pp. 1921-1930, Jun. 2023.
Paul Debevec, Tim Hawkins, Chris Tchou, Haarm-Pieter Duiker, Westley Sarokin, and Mark Sagar. "Acquiring the Reflectance Field of a Human Face". Seminal Graphics Papers: Pushing the Boundaries, vol. 2, pp. 145-156, Jul. 1, 2000. URL: <https://api.semanticscholar.org/CorpusID:2860203>.
Prafulla Dhariwal and Alexander Nichol. "Diffusion Models Beat GANs on Image Synthesis". Advances in Neural Information Processing Systems (NeurIPS), 34:8780-8794, May 2021.
Puntawat Ponglertnapakorn, Nontawat Tritrong, and Supasorn Suwajanakorn. "DiFaReli: Diffusion Face Relighting". In Proceedings of the IEEE/CVF International Conference on Computer Vision, pp. 22646-22657, Apr. 2023.
Qihang Yu, Jianming Zhang, He Zhang, Yilin Wang, Zhe Lin, Ning Xu, Yutong Bai, and Alan Yuille. "Mask Guided MMatting via Progressive Refinement Network". In Proceedings of the IEEE/CVF Conference on Computer Vision and Pattern Recognition (CVPR), pp. 1154-1163, Jun. 2021.
Richard Zhang, Phillip Isola, Alexei A. Efros, Eli Shechtman, and Oliver Wang. "The Unreasonable Effectiveness of Deep Features as a Perceptual Metric". In Proceedings of the IEEE Conference on Computer Vision and Pattern Recognition (CVPR), pp. 586-595, Jun. 2018.
Robin Rombach, Andreas Blattmann, Dominik Lorenz, Patrick Esser, and Bjorn Ommer. "High-Resolution Image Synthesis with Latent Diffusion Models". In Proceedings of the IEEE/CVF Conference on Computer Vision and Pattern Recognition (CVPR), pp. 10684-10695, 2022.
Rohit Pandey, Sergio Orts Escolano, Chloe Legendre, Christian Haene, Sofien Bouaziz, Christoph Rhemann, Paul Debevec, and Sean Fanello. "Total Relighting: Learning to Relight Portraits for Background Replacement". ACM Transactions on Graphics (TOG), 40(4):1-21, Aug. 2021.
Ron Mokady, Amir Hertz, Kfir Aberman, Yael Pritch, and Daniel Cohen-Or. "Null-text Inversion for Editing Real Images using Guided Diffusion Models". arXiv preprint arXiv:2211.09794v1, Nov. 17, 2022.
Shaoan Xie, Zhifei Zhang, Zhe Lin, Tobias Hinz, and Kun Zhang. "SmartBrush: Text and Shape Guided Object Inpainting with Diffusion Model". In Proceedings of the IEEE/CVF Conference on Computer Vision and Pattern Recognition (CVPR), pp. 22428-22437, Jun. 2023.
Shen Nie, Hanzhong Allan Guo, Cheng Lu, Yuhao Zhou, Chenyu Zheng, and Chongxuan Li. "The Blessing of Randomness: SDE Beats ODE in General Diffusion-Based Image Editing". arXiv preprint arXiv:2311.01410v1, Nov. 2, 2023.
Shilin Lu, Yanzhu Liu, and Adams Wai-Kin Kong. "TF-ICOM: Diffusion-Based Training-Rree Cross-Domain Image Composition". In Proceedings of the IEEE/CVF International Conference on Computer Vision, pp. 2294-2305, Oct. 2023.
Su Xue, Aseem Agarwala, Julie Dorsey, and Holly Rushmeier. "Understanding and Improving the Realism of Image Composites". ACM Transactions on graphics (TOG), 31(4): 1-10, Jul. 2012.
Tengfei Wang, Ting Zhang, Bo Zhang, Hao Ouyang, Dong Chen, Qifeng Chen, and Fang Wen. "Pretraining is All You Need for Image-to-Image Translation". arXiv preprint arXiv:2205.12952v1, May 25, 2022.
Thomas Nestmeyer, Jean-Francois Lalonde, Iain Matthews, and Andreas Lehrmann. "Learning Physics-guided Face Relighting under Directional Light". In Conference on Computer Vision and Pattern Recognition (CVPR), pp. 5124-5133, Jun. 2020.
Tiancheng Sun, Jonathan T Barron, Yun-Ta Tsai, Zexiang Xu, Xueming Yu, Graham Fyffe, Christoph Rhemann, Jay Busch, Paul Debevec, and Ravi Ramamoorthi. "Single Image Portrait Relighting". ACM Transactions on Graphics (TOG), 38(4):1-12, Jul. 2019.
Tim Brooks, Aleksander Holynski, and Alexei A. Efros. "InstructPix2Pix: Learning to Follow Image Editing Instructions". In Proceedings of the IEEE/CVF Conference on Computer Vision and Pattern Recognition (CVPR), pp. 18392-18402, Jun. 2023.
Tsu-Jui Fu, Wenze Hu, Xianzhi Du, William Yang Wang, Yinfei Yang, and Zhe Gan. "Guiding Instruction-Based Image Editing via Multimodal Large Language Models". arXiv preprint arXiv:2309.17102v1, Sep. 29, 2023.
Wenyan Cong, Jianfu Zhang, Li Niu, Liu Liu, Zhixin Ling, Weiyuan Li, and Liqing Zhang. "DoveNet: Deep Image Harmonization via Domain Verification". In Proceedings of the IEEE/CVF Conference on Computer Vision and Pattern Recognition (CVPR), pp. 8394-8403, Jun. 2020.
Wenyan Cong, Xinhao Tao, Li Niu, Jing Liang, Xuesong Gao, Qihao Sun, and Liqing Zhang. "High-Resolution Image Harmonization via Collaborative Dual Transformations". In Proceedings of the IEEE/CVF Conference on Computer Vision and Pattern Recognition (CVPR), pp. 18470-18479, Jun. 2022.
Xiuming Zhang, Sean Fanello, Yun-Ta Tsai, Tiancheng Sun, Tianfan Xue, Rohit Pandey, Sergio Orts-Escolano, Philip Davidson, Christoph Rhemann, Paul Debevec, et al. "Neural Light Transport for Relighting and View Synthesis". ACM TOG, 40(1):1-17, Jan. 2021.
Xuaner Zhang, Jonathan T Barron, Yun-Ta Tsai, Rohit Pandey, Xiuming Zhang, Ren Ng, and David E Jacobs. "Portrait Shadow Manipulation". ACM Transactions on Graphics (TOG), 39(4), 14 pages, Aug. 2020.
Yao Feng, Haiwen Feng,Michael J Black, and Timo Bolkart. "Learning an Animatable Detailed 3D Face Model from In-The-Wild Images". ACM Transactions on Graphics (ToG), 40(4): 1-13, Aug. 2021.
Yi-Hsuan Tsai, Xiaohui Shen, Zhe Lin, Kalyan Sunkavalli, Xin Lu, and Ming-Hsuan Yang. "Deep Image Harmonization". In Proceedings of the IEEE Conference on Computer Vision and Pattern Recognition, pp. 3789-3797, 2017.
Yifan Jiang, He Zhang, Jianming Zhang, Yilin Wang, Zhe Lin, Kalyan Sunkavalli, Simon Chen, Sohrab Amirghodsi, Sarah Kong, and Zhangyang Wang. "SSH: A Self-Supervised Framework for

(56) References Cited

OTHER PUBLICATIONS

Image Harmonization". In Proceedings of the IEEE/CVF International Conference on Computer Vision, pp. 4832-4841, Aug. 2021.
Yijiang Wang, Yuqi Li, ChongWang, and Xulun Ye. "Harmonized Portrait-Background Image Composition". In Computer Graphics Forum, 42(6), p. e14921. Wiley Online Library, Aug. 2023.
Yiqun Mei, He Zhang, Xuaner Zhang, Jianming Zhang, Zhixin Shu, Yilin Wang, Zijun Wei, Shi Yan, HyunJoon Jung, and Vishal M. Patel. "LightPainter: Interactive Portrait Relighting with Freehand Scribble". In Proceedings of the IEEE/CVF Conference on Computer Vision and Pattern Recognition (CVPR), pp. 195-205, Jun. 2023.
Yu-Ying Yeh, Koki Nagano, Sameh Khamis, Jan Kautz, Ming-Yu Liu, and Ting-Chun Wang. "Learning to Relight Portrait Images via a Virtual Light Stage and Synthetic-to-Real Adaptation". ACM Transactions on Graphics (TOG), 41(6): 1-21, Nov. 2022.
Yuval Alaluf, Daniel Garibi, Or Patashnik, Hadar Averbuch-Elor, and Daniel Cohen-Or. "Cross-Image Attention for Zero-Shot Appearance Transfer". arXiv preprint arXiv:2311.03335, Nov. 6, 2023.
Zhanghan Ke, Chunyi Sun, Lei Zhu, Ke Xu, and Rynson W.H. Lau. "Harmonizer: Learning to Perform White-Box Image and Video Harmonization". In European Conference on Computer Vision (ECCV), Jul. 2022.
Zhibo Wang, Xin Yu, Ming Lu, QuanWang, Chen Qian, and Feng Xu. "Single Image Portrait Relighting via Explicit Multiple Reflectance Channel Modeling". ACM Transactions on Graphics (TOG), 39(6):1-13, Dec. 2020.
Zhixing Zhang, Ligong Han, Arnab Ghosh, Dimitris N Metaxas, and Jian Ren. "Sine: Single Image Editing with Text-to-Image Diffusion Models". In Proceedings of the IEEE/CVF Conference on Computer Vision and Pattern Recognition, pp. 6027-6037, Jun. 2023.
Zonghui Guo, Dongsheng Guo, Haiyong Zheng, Zhaorui Gu, Bing Zheng, and Junyu Dong. "Image Harmonization with Transformer". In Proceedings of the IEEE/CVF International Conference on Computer Vision, pp. 14870-14879, Oct. 2021.
Zonghui Guo, Haiyong Zheng, Yufeng Jiang, Zhaorui Gu, and Bing Zheng. "Intrinsic Image Harmonization". In Proceedings of the IEEE/CVF Conference on Computer Vision and Pattern Recognition (CVPR), pp. 16367-16376, Jun. 2021.

* cited by examiner

GENERATING DIGITAL IMAGES UTILIZING A DIFFUSION-BASED NETWORK CONDITIONED ON LIGHTING-AWARE FEATURE REPRESENTATIONS

BACKGROUND

Improvements to machine-learning and neural network based image processing technologies have led to significant advancements in the ability of computing systems to generate synthetic image content. Many entities utilize generative neural networks to generate synthetic image content for use in a number of different applications, such as creating new images, replacing objects, inserting objects from one image into another, or otherwise inserting synthetic digital content into digital images. Although the quality of generative neural networks has steadily improved in generating realistic-looking content, ensuring that content inserted into a digital image (e.g., a foreground object into a background image) is visually consistent with the rest of the content of the digital image in terms of color and lighting effects is an important aspect of image editing operations. Existing systems that modify digital images lack accuracy and flexibility in generating visually consistent image content when inserting objects into another digital image.

SUMMARY

One or more embodiments provide benefits and/or solve one or more of the foregoing or other problems in the art with systems, methods, and non-transitory computer readable storage media for generating lighting aware image content utilizing diffusion-based generative neural networks. In response to a request to generate a digital image by inserting an object into a target background image, the disclosed systems utilize a lighting conditioning neural network to generate a lighting feature representation indicating lighting parameters of the target background image within an encoding space. Additionally, the disclosed systems condition a diffusion-based generative neural network on the lighting feature representation of the target background image. The disclosed systems utilize the diffusion-based generative neural network to generate a digital image including the object inserted into the target background image by modifying the object to have lighting and color harmonization with the target background image according to the lighting parameters of the target background image.

In some embodiments, the disclosed systems utilize a three-stage training process to train the diffusion-based generative neural network and the lighting conditioning neural network. Specifically, the disclosed systems utilize a first training stage to provide lighting aware diffusion by incorporating the lighting feature representation of the target background image into the diffusion loss. The disclosed systems also utilize a second training stage to ensure that the lighting feature representation of the target background image aligns with an environment lighting feature representation generated from an environment map of the target background image. Furthermore, the disclosed systems utilize a third training stage to finetune the diffusion-based generative neural network by generating a synthesis training dataset based on a set of digital images, synthetic background images, and synthetic digital images generated utilizing the diffusion-based generative neural network. The disclosed systems thus train and utilize a diffusion-based generative neural network conditioned on lighting feature representations of background images to generate lighting aware synthetic image content.

BRIEF DESCRIPTION OF THE DRAWINGS

Various embodiments will be described and explained with additional specificity and detail through the use of the accompanying drawings.

DETAILED DESCRIPTION

Figure 1:
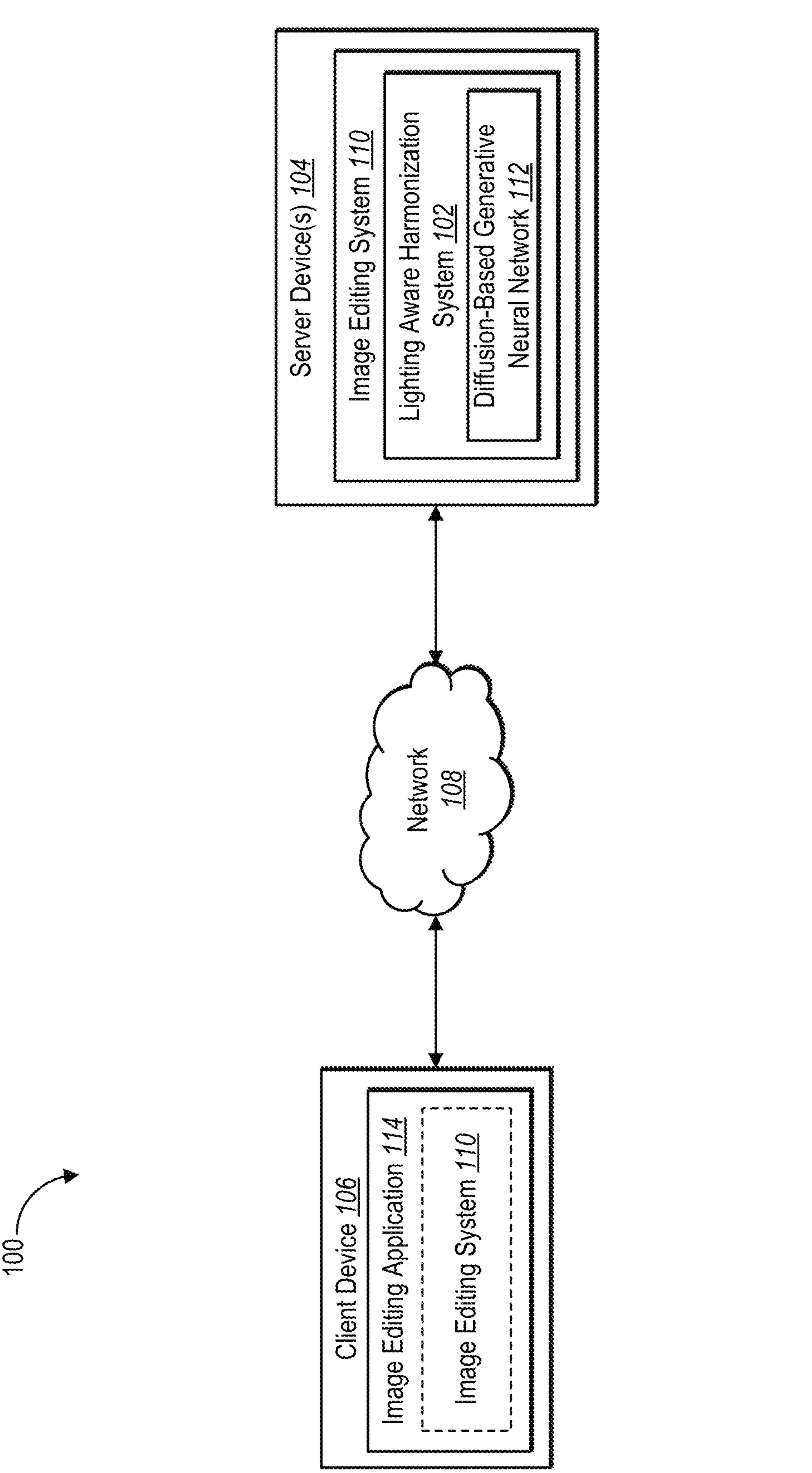
FIG. 1 illustrates an example system environment in which a lighting aware harmonization system operates in accordance with one or more implementations.

One or more embodiments of the present disclosure include a lighting aware harmonization system that generates synthetic digital images via a diffusion-based generative neural network conditioned on lighting features extracted from a target background image. In particular, in response to a request to insert an object into a target background image, the lighting aware harmonization system encodes lighting parameters from the target background image into a lighting feature representation. Additionally, the lighting aware harmonization system utilizes the lighting feature representation to condition the diffusion-based generative neural network and generate a digital image with lighting awareness relative to the target background image. Accordingly, by conditioning the diffusion-based generative neural network on the lighting feature encoded from the target background image, the lighting aware harmonization system provides accurate lighting aware image content in connection with moving objects from one set of lighting/coloring conditions into another image with a different set of lighting/coloring conditions.

In one or more embodiments, as mentioned, the lighting aware harmonization system extracts lighting features from a target background image. Specifically, the lighting aware harmonization system utilizes a lighting conditioning neural network corresponding to the diffusion-based generative neural network to determine a lighting feature representation of the target background image. For instance, the lighting aware harmonization system determines the target background image from a composite input (e.g., foreground object with the target background) and a foreground mask. Additionally, the lighting aware harmonization system generates the lighting feature representation by extracting lighting parameters from the target background image utilizing the lighting conditioning neural network.

Furthermore, the lighting aware harmonization system utilizes the lighting feature representation to condition a diffusion-based generative neural network. In one or more embodiments, the lighting aware harmonization system injects the lighting feature representation into the diffusion-based generative neural network at different resolutions/scales to condition denoising operations of the diffusion-based generative neural network on the lighting feature representation. Accordingly, the lighting aware harmonization system utilizes the diffusion-based generative neural network to generate a digital image including the foreground object inserted into the target background while modifying pixel values of the foreground object based on the lighting parameters extracted from the target background image.

In additional embodiments, the lighting aware harmonization system utilizes a plurality of training stages to train the diffusion-based generative neural network, the lighting conditioning neural network, and one or more additional neural network layers based on lighting feature representations of background images. In particular, the lighting aware harmonization system utilizes a first stage to train the diffusion-based generative neural network and the lighting conditioning neural network on a diffusion loss incorporating the lighting feature representation. Furthermore, the lighting aware harmonization system utilizes a second stage to align lighting feature extracted from background images to environment lighting features extracted from environment maps of the background images. Additionally, the lighting aware harmonization system utilizes a third stage to finetune the diffusion-based generative neural network based on a synthesis training dataset including images generated according to the first two stages of the training process.

Some conventional systems that provide image generation utilize generative neural networks to generate digital images by modifying various lighting or color parameters of the digital images. For example, some conventional systems utilize processes that provide image harmonization between an object and other image content. Although such conventional systems provide color modification to rectify color, contrast, and style differences between a foreground and a background, such systems primarily focus on global color adjustments while overlooking discrepancies in foreground and background lighting (e.g., direction, intensity, shadow effects). Thus, such conventional systems lack accuracy by generating synthetic image content that looks unnatural due to mismatched lighting conditions.

Some conventional systems that provide image generation utilize deep learning methods to provide portrait relighting. Although such systems provide lighting aware image editing, these systems lack flexibility in terms of applicability to different scenarios. Specifically, conventional systems that use deep learning to provide portrait relighting typically require high dynamic range ("HDR") maps for background replacement and harmonization tasks. HDR maps are usually not easily captured alongside background images for most image editing tasks, given that many images (e.g., photographs) are captured in casual settings with mobile devices. Thus, these conventional systems are not usable for the vast majority of image editing tasks.

Furthermore, conventional systems that rely on deep learning methods for portrait relighting also utilize multi-stage frameworks or rely heavily on external packages. Given such architectures and/or reliance on external tools, the conventional systems are often prone to errors propagating through the various intermediate steps. Additionally, these conventional systems are often trained on datasets from limited illumination acquisition techniques, resulting in target images that are not captured in real-world conditions, but rather rendered composites. Accordingly, the conventional systems lack accuracy in generating lighting aware content in certain domains, unseen images in arbitrary background replacement tasks, or in view of errors propagated through the models.

The lighting aware harmonization system provides a number of advantages in computing systems that perform background replacement/object insertion tasks in digital images. For example, the lighting aware harmonization system provides lighting aware image editing with accurate color harmonization via a diffusion-based generative neural network. In contrast to conventional systems that utilize image harmonization to provide color consistency of objects inserted into backgrounds but lack lighting consistency, the lighting aware harmonization system provides both color harmonization and lighting consistency between foreground objects and background images. Specifically, by utilizing a diffusion-based generative neural network conditioned on lighting features extracted from a background image, the lighting aware harmonization system generates lighting aware digital images that apply the lighting features (e.g., direction, intensity) of the background image to the foreground object.

Furthermore, the lighting aware harmonization system provides accurate lighting aware digital image editing for use in many different image editing scenarios. In particular, the lighting aware harmonization system provides lighting aware image editing based on a background image as a conditioning mechanism for a diffusion-based generative neural network. In contrast to conventional systems that require HDR maps (or similar lighting maps), the lighting aware harmonization system utilizes only a background image to extract lighting features for use in modifying a foreground object. By conditioning the diffusion-based generative neural network on the lighting features extracted from only the background image, the lighting aware harmonization system provides lighting aware image capabilities to many different scenarios in which HDR maps are not available (e.g., mobile photography, images without a known provenance).

Additionally, by utilizing a single background image to condition a diffusion-based generative neural network for lighting aware image editing, the lighting aware harmonization system also improves image accuracy editing in various domains. For example, in contrast to conventional systems that utilize datasets rendered from images not captured in real-world conditions, the lighting aware harmonization system trains neural networks to provide lighting aware image editing in many different real-world scenarios. More specifically, the lighting aware harmonization system utilizes a plurality of different training stages that improve performance of diffusion models based on a target background image while also ensuring that the extracted lighting features align with corresponding environment lighting features. Accordingly, the lighting aware harmonization system utilizes training processes to provide lighting awareness in image editing tasks without the need for HDR maps (or other environment maps) during inference.

Turning now to the figures, FIG. 1 includes an embodiment of a system environment 100 in which a lighting aware harmonization system 102 is implemented. In particular, the system environment 100 includes server device(s) 104 and a client device 106 in communication via a network 108. Moreover, as shown, the server device(s) 104 include a image editing system 110, which includes the lighting aware harmonization system 102. Additionally, the lighting aware harmonization system 102 includes, or accesses, a diffusion-based generative neural network 112. Although FIG. 1 illustrates that the server device(s) 104 host the diffusion-based generative neural network 112, in alternative embodiments, the diffusion-based generative neural network 112 are hosted by another device or system (e.g., a third-party computing system). Furthermore, the client device 106 includes an image editing application 114, which optionally includes the image editing system 110 (and the lighting aware harmonization system 102).

As shown in FIG. 1, the client device 106 or the server device(s) 104 include or host the image editing system 110. The image editing system 110 includes, or is part of, one or more systems that implement digital image generation or editing operations. For example, the image editing system 110 provides tools for generating or editing digital images (e.g., in background replacement tasks). To illustrate, the image editing system 110 communicates with the client device 106 via the network 108 to provide the tools for display and interaction via the image editing application 114 at the client device 106. Additionally, in some embodiments, the image editing system 110 receives requests to access digital image data stored (e.g., at the server device(s) 104 or at another device such as a database) and/or requests to store digital image data. In some embodiments, the image editing system 110 receives interaction data for viewing or performing various image processing operations and provides the results of the interaction data (e.g., generated digital image data) for display via the image editing application 114 or to a third-party system.

According to one or more embodiments, the image editing system 110 utilizes the lighting aware harmonization system 102 to generate digital images via the diffusion-based generative neural network 112 with lighting awareness. In particular, the lighting aware harmonization system 102 utilizes lighting parameters extracted from a background image into which an object is inserted to condition the diffusion-based generative neural network 112 for generating a final digital image with consistent lighting between the object and background. Additionally, in some embodiments, the lighting aware harmonization system 102 trains the diffusion-based generative neural network 112 and one or more additional neural networks in a multi-phase training process, including generating a synthesis training dataset with synthetic images. Accordingly, the lighting aware harmonization system 102 utilizes the diffusion-based generative neural network 112 to generate accurate image content generation that provides lighting aware background replacement on only background images and without the need for environment maps.

As illustrated in FIG. 1, the lighting aware harmonization system 102 is implemented on the client device 106 or on the server device(s) 104. In particular, in some implementations, the lighting aware harmonization system 102 on the server device(s) 104 supports the lighting aware harmonization system 102 on the client device 106. For instance, the server device(s) 104 generates or obtains the lighting aware harmonization system 102 (e.g., the diffusion-based generative neural network 112) for the client device 106 (e.g., as part of a software application or suite). The server device(s) 104 provides the lighting aware harmonization system 102 to the client device 106 for performing digital image generation/editing processes at the client device 106. In other words, the client device 106 obtains (e.g., downloads) the lighting aware harmonization system 102 from the server device(s) 104. At this point, the client device 106 is able to utilize the lighting aware harmonization system 102 to generate/edit digital images independently from the server device(s) 104.

In additional embodiments, although FIG. 1 illustrates the server device(s) 104 and the client device 106 communicating via the network 108, the various components of the system environment 100 communicate and/or interact via other methods (e.g., the server device(s) 104 and the client device 106 communicate directly). Furthermore, although FIG. 1 illustrates the lighting aware harmonization system 102 being implemented by a particular component and/or device within the system environment 100, the lighting aware harmonization system 102 is implemented, in whole or in part, by other computing devices and/or components in the system environment 100. For example, in some embodiments, the server device(s) 104 include or host the image editing system 110 and/or the lighting aware harmonization system 102.

To illustrate, the lighting aware harmonization system 102 includes a web hosting application that allows the client device 106 to interact with content and services hosted on the server device(s) 104 (e.g., in a software as a service implementation). To illustrate, in one or more implementations, the client device 106 accesses a web page supported by the server device(s) 104. The client device 106 provides input to the server device(s) 104 to perform digital image generation and, in response, the lighting aware harmonization system 102 or the image editing system 110 on the server device(s) 104 performs operations to generate a digital image via the diffusion-based generative neural network 112. The server device(s) 104 provide the output or results of the operations to the client device 106.

In one or more embodiments, the server device(s) 104 include a variety of computing devices, including those described below with reference to FIG. 15. For example, the server device(s) 104 includes one or more servers for storing and processing data associated with image generation and editing. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 15). Furthermore, although not shown in FIG. 1, the client device 106 is operable by a user (e.g., a user included in, or associated with, the system environment 100) to perform a variety of functions. In particular, the client device 106 performs functions such as, but not limited to, accessing, viewing, generating, and editing digital images. In some embodiments, the client device 106 also performs functions for generating, capturing, or accessing data to provide to the image editing system 110 and the lighting aware harmonization system 102 in connection with editing digital images. For example, the client device 106 communicates with the server device(s) 104 via the network 108 to provide information (e.g., user interactions) associated with digital images. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 optionally include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 15.

Figure 2:
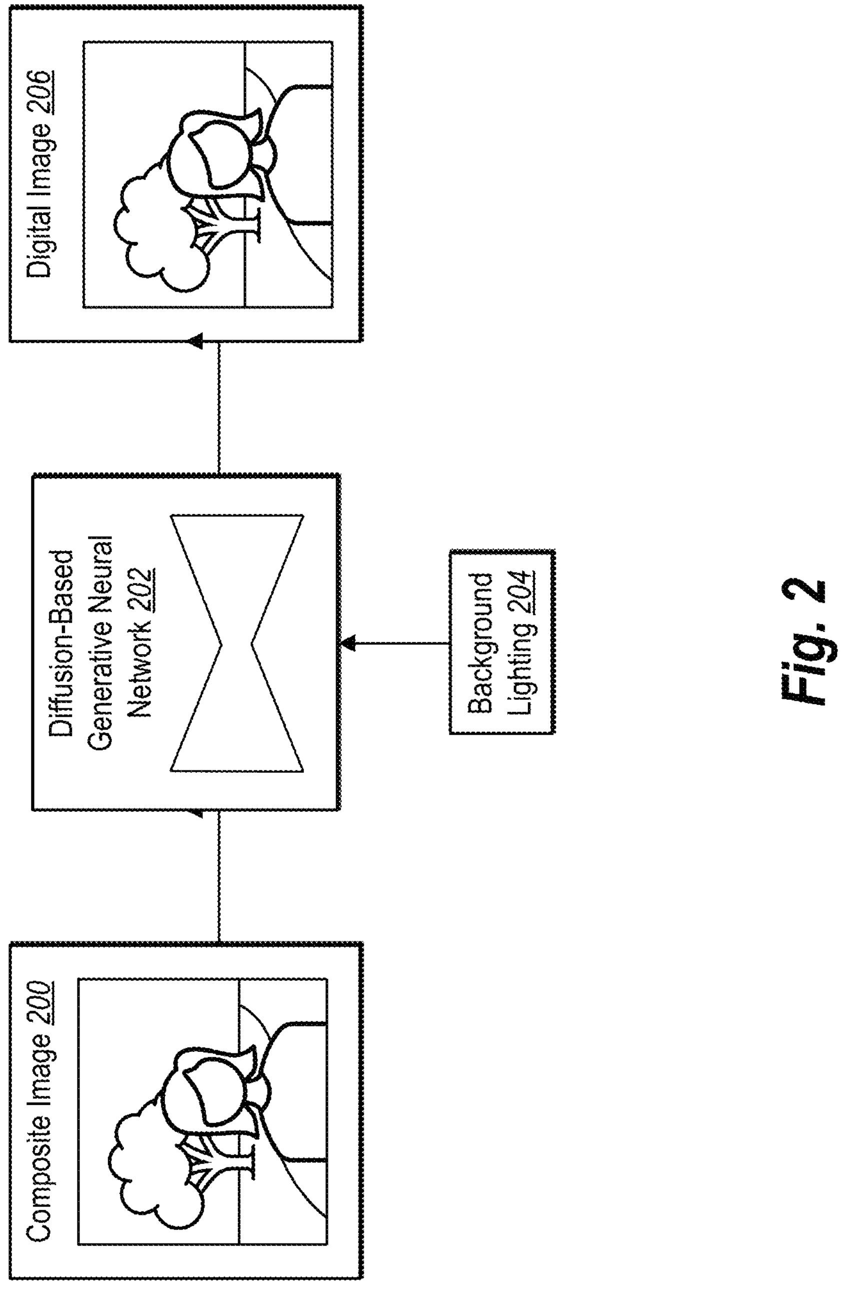
FIG. 2 illustrates a diagram of an overview of the lighting aware harmonization system inserting an object into a target background image utilizing a diffusion-based generative neural network conditioned on background lighting in accordance with one or more implementations.

As mentioned, the lighting aware harmonization system 102 utilizes a diffusion-based generative neural network conditioned on lighting features from a background image to edit digital images. FIG. 2 illustrates a diagram of the lighting aware harmonization system utilizing a diffusion-based generative neural network with background lighting to generate modified image content. Specifically, FIG. 2 illustrates that the lighting aware harmonization system 102 modifies lighting features of a foreground object inserted into a background image according to lighting features extracted from the background image.

Figure 3:
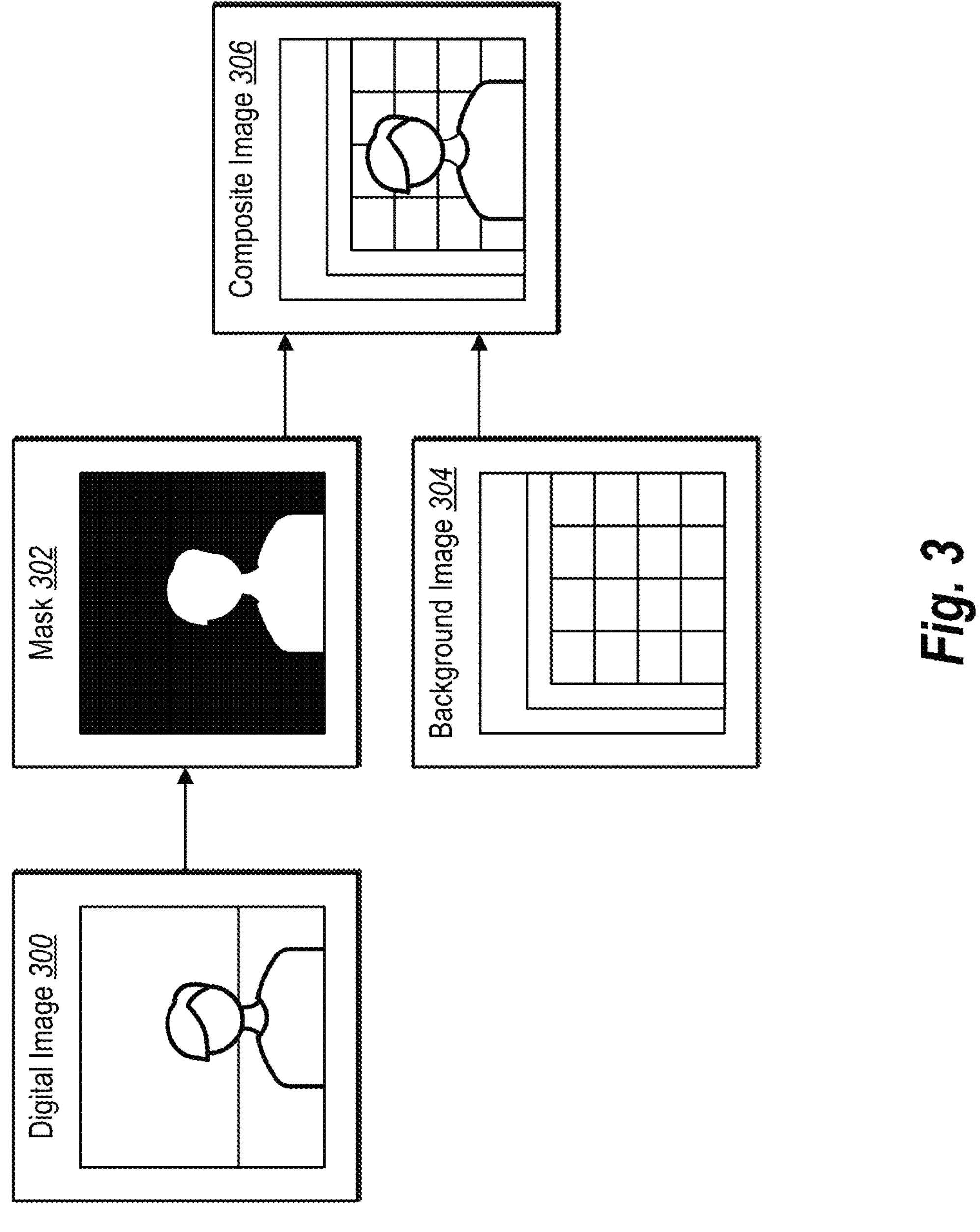
FIG. 3 illustrates a diagram of a composite image based on an object of a digital image and a background image in accordance with one or more implementations.

As illustrated in FIG. 2, the lighting aware harmonization system 102 determines a composite image 200 including digital image content to use in generating image content via a diffusion-based generative neural network 202. For example, the composite image 200 includes at least one foreground object inserted into a target background image (e.g., a background image selected for replacing a background image from which the foreground object is extracted). FIG. 3 and the corresponding description provide additional detail with respect to determining the composite image 200.

In one or more embodiments, the diffusion-based generative neural network 202 includes a computer representation that is tuned (e.g., trained) based on inputs to approximate unknown functions. For instance, a neural network includes one or more layers or artificial neurons that approximate unknown functions by analyzing known data at different levels of abstraction. In some embodiments, the diffusion-based generative neural network 202 includes one or more neural network layers including, but not limited to, a convolutional neural network, a recurrent neural network, a transformer-based neural network, or a feedforward neural network. Furthermore, in one or more embodiments, the diffusion-based generative neural network 202 includes, but is not is limited to, a diffusion-based model including one or more transformer-based neural network layers (e.g., diffusion decoders) that generate digital image content according to a noise input in a series of diffusion (e.g., denoising) steps. For example, the diffusion-based generative neural network 202 includes a diffusion-based model as described in U.S. application Ser. No. 18/532,457, "SYNTHESIZING SHADOWS IN DIGITAL IMAGES UTILIZING DIFFUSION MODELS," to Kim et al., which is herein incorporated by reference in its entirety. Additionally, in one or more embodiments, the diffusion-based generative neural network 202 includes an encoder neural network that encodes digital images into feature vectors representing image content in a latent image space.

Additionally, FIG. 2 illustrates that the lighting aware harmonization system 102 determines background lighting 204 for generating image content from the composite image 200. In one or more embodiments, the lighting aware harmonization system 102 determines the background lighting 204 by extracting lighting features from the background image of the composite image 200. In particular, as described in more detail with respect to FIG. 4, the lighting aware harmonization system 102 utilizes a trained lighting conditioning neural network to extract the background lighting 204 from the background image of the composite image 200.

Figure 4:
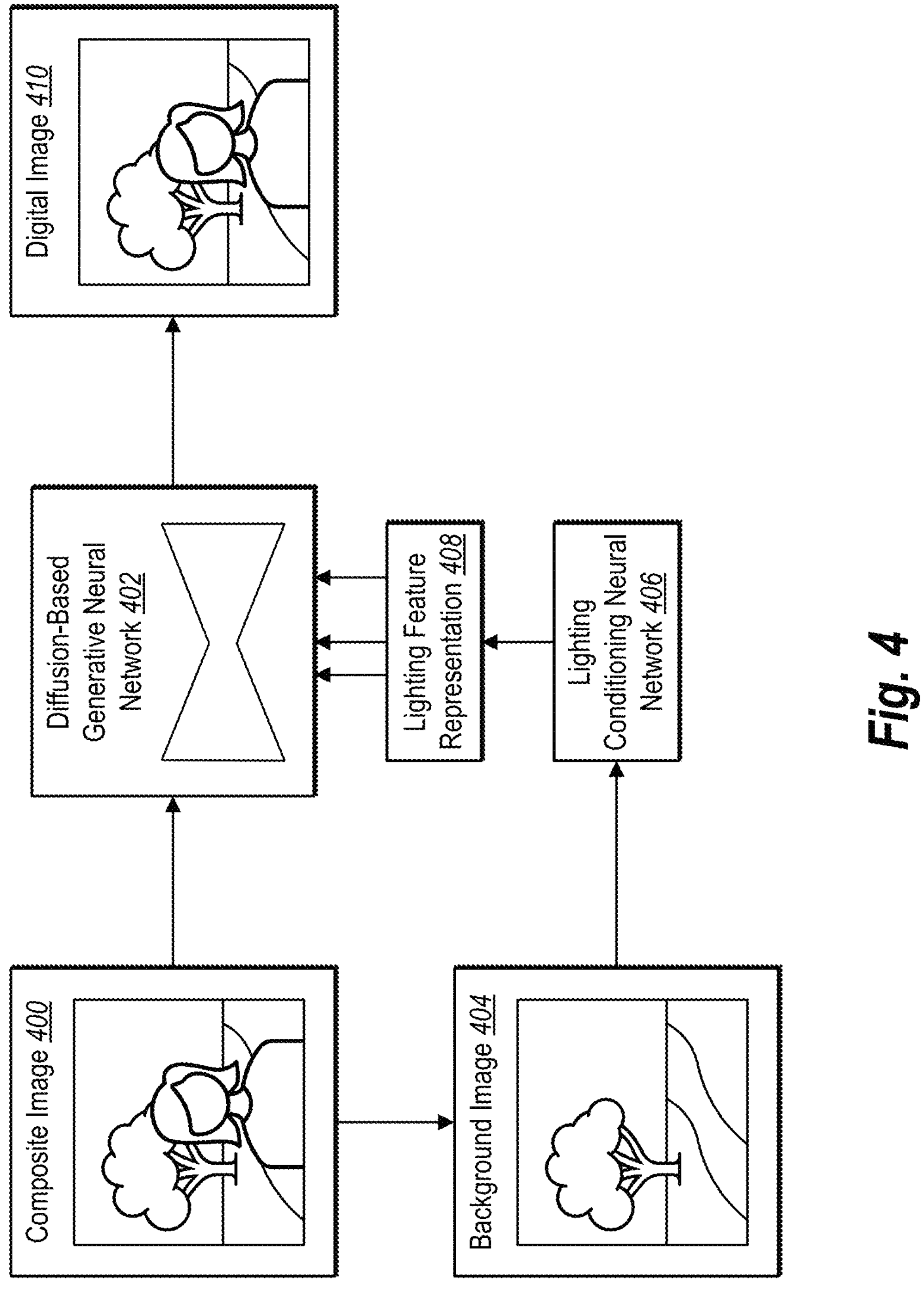
FIG. 4 illustrates a diagram of the lighting aware harmonization system utilizing a diffusion-based generative neural network conditioned on a lighting feature representation of a background image to generate a digital image in accordance with one or more implementations.

In one or more embodiments, as illustrated in FIG. 2, the lighting aware harmonization system 102 utilizes the diffusion-based generative neural network 202 to generate a digital image 206 based on the composite image 200. For instance, the lighting aware harmonization system 102 utilizes the diffusion-based generative neural network 202 conditioned on the background lighting 204 to modify lighting features of the foreground object in the composite image 200 according to the lighting features of the background image. FIG. 4 and the corresponding description provide additional details with respect to generating a digital image with lighting awareness based on a target background image.

Furthermore, in some embodiments, the lighting aware harmonization system 102 utilizes a multi-stage training process to train the diffusion-based generative neural network 202 and one or more additional neural networks involved in the image editing process. FIGS. 5-9 and the corresponding description provide additional details with respect to training the diffusion-based generative neural network 202 and additional neural networks. Furthermore, FIG. 9 and the corresponding description provide additional details related to generating a synthesis training dataset for use in training the diffusion-based generative neural network 202.

As mentioned, FIG. 3 illustrates an example of the lighting aware harmonization system 102 determining a composite image in connection with generating a digital image inserting content into an image. For example, as illustrated, the lighting aware harmonization system 102 determines a digital image 300 including one or more objects in a scene. To illustrate, the digital image 300 includes a digital photograph including one or more objects such as people or items. In one or more embodiments, the digital image 300 includes a portrait of a person or a photograph of a plurality of people.

In one or more embodiments, as mentioned, the lighting aware harmonization system 102 performs image editing tasks to insert content into an image. Accordingly, the lighting aware harmonization system 102 determines one or more of the object(s) in the digital image 300 to insert into a separate image. Although FIG. 3 illustrates determining an object from a first image to insert into a second image, in other embodiments, the lighting aware harmonization system 102 determines an object generated within an image editing application for insertion into a digital image.

In at least some embodiments, the lighting aware harmonization system 102 determines a mask 302 for an object in the digital image 300. Specifically, the lighting aware harmonization system 102 determines the mask 302 indicating a boundary of a foreground object in the digital image 300. For example, the mask 302 includes an alpha matte including specific values representing a foreground, a background, and a blended boundary region (e.g., a region containing both foreground elements and background elements such as partially transparent objects or fine details such as hair or fur). Additionally, in some embodiments, the lighting aware harmonization system 102 includes a plurality of masks corresponding to a plurality of objects from the digital image 300 (or from a plurality of separate images).

Additionally, as shown, the lighting aware harmonization system 102 determines a background image 304 for inserting an object corresponding to the mask 302. For instance, the lighting aware harmonization system 102 determines the background image 304 in response to a selection, upload, or other indication of a target background image for inserting the object(s). To illustrate, the lighting aware harmonization system 102 determines the background image 304 as the target background image for replacing a background of the digital image 300 with the background image 304. Alternatively, the lighting aware harmonization system 102 determines the background image 304 in response to a request to insert one or more objects from one or more digital images (including the digital image 300) into the background image 304.

As illustrated in FIG. 3, the lighting aware harmonization system 102 determines the composite image 306 according to the one or more objects from the digital image 300 (and/or other digital images) and the background image 304. Furthermore, in at least some embodiments, the lighting aware harmonization system 102 stores the mask 302 with the composite image 306. In some embodiments, the composite image 306 includes a flat image with one or more masks (e.g., the mask 302) indicating the portions of the image to modify. In one or more embodiments, the composite image 306 includes a plurality of layers corresponding to the background image 304 and the object(s) being inserted into the background image (e.g., a first layer for the background image 304 and a second layer for the object from the digital image 300). In additional embodiments, the composite image 306 includes two separate images with one or more additional operations (e.g., one or more additional neural networks) and one or more masks to isolate the object(s) from a first image for insertion into a second image.

In one or more embodiments, in response to determining a composite image (or otherwise determining an object and a target background image), the lighting aware harmonization system 102 generates a modified digital image utilizing one or more neural networks. In particular, FIG. 4 illustrates that the lighting aware harmonization system 102 utilizes a composite image to generate image content in a diffusion-based image generation process. Additionally, as illustrated, the lighting aware harmonization system 102 conditions the diffusion-based image generation process utilizing background lighting from a target background image.

As mentioned above, the lighting aware harmonization system 102 determines a composite image 400 including an object and a target background image. In one or more embodiments, the lighting aware harmonization system 102 provides the composite image 400 as input to a diffusion-based generative neural network 402 to generate a modified image inserting the object into the target background image. Furthermore, the lighting aware harmonization system 102 utilizes the diffusion-based generative neural network 402 to modify the lighting features of the object based on lighting features of the background to provide consistent lighting and coloring in the modified image.

Specifically, as illustrated in FIG. 4, the lighting aware harmonization system 102 determines a background image 404 (e.g., the target background image) from the composite image 400. In one or more embodiments, the lighting aware harmonization system 102 provides the background image 404 to a lighting conditioning neural network 406 to extract lighting features of the background image 404. For example, the lighting conditioning neural network 406 encodes a lighting feature representation 408 from the background image 404 to represent lighting features of the background image 404. To illustrate, the lighting feature representation 408 includes an abstract representation of certain lighting features (e.g., based on light sources, light source types, lighting direction, lighting intensity, lighting color) of the background image 404 in an encoding space. In one or more embodiments, the lighting feature representation 408 includes one or more conditional feature maps representing the lighting features of the background image 404.

In one or more embodiments, the lighting conditioning neural network 406 includes a neural network with a plurality of layers (e.g., in a convolutional neural network) to encode the lighting features of the background image 404 at a plurality of resolutions/scales. For instance, the lighting aware harmonization system 102 utilizes the lighting conditioning neural network 406 to encode the lighting features at a resolution of the background image 404 and/or at a plurality of resolutions lower than the resolution of the background image 404. Accordingly, the lighting aware harmonization system 102 utilizes the lighting conditioning neural network 406 to provide the lighting feature representation 408 to the diffusion-based generative neural network 402 at the plurality of resolutions.

Additionally, as illustrated in FIG. 4, the lighting aware harmonization system 102 utilizes the diffusion-based generative neural network 402 to generate a digital image 410 based on the composite image 400. Specifically, the lighting aware harmonization system 102 utilizes the diffusion-based generative neural network 402 to generate the digital image 410 by modifying pixel values corresponding to the object based on the lighting features of the background image 404. Accordingly, the lighting aware harmonization system 102 conditions the diffusion-based generative neural network 402 based on lighting features extracted from only the background image 404.

Figure 5:
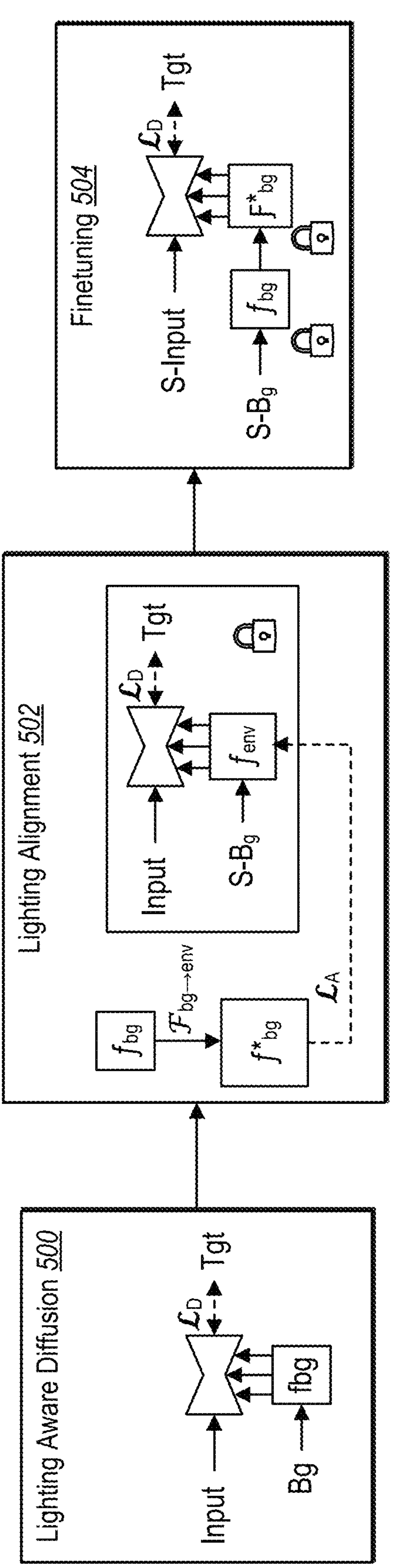
FIG. 5 illustrates a diagram of the lighting aware harmonization system utilizing a three-stage process to train a diffusion-based generative neural network conditioned on lighting feature representations of background images in accordance with one or more implementations.

As mentioned, in some embodiments, the lighting aware harmonization system 102 also trains one or more neural networks involved in lighting aware image editing operations. FIGS. 5-9 illustrate diagrams of the lighting aware harmonization system 102 performing a multi-stage training process. Specifically, FIG. 5 illustrates an overview of the multi-stage training process including a plurality of training stages for training and finetuning a plurality of neural networks in a diffusion-based image editing process. Additionally, FIGS. 6-9 illustrate diagrams including details related to the individual stages of the multi-stage training process.

As illustrated in FIG. 5, the lighting aware harmonization system 102 utilizes a plurality of training stages for training a diffusion-based generative neural network and one or more additional neural networks to generate a harmonized image from a composite input. More specifically, the lighting aware harmonization system 102 utilizes the plurality of training stages to develop a conditional diffusion-based generative neural network that processes a composite image (with an alpha mask) as an input, conditioned on the target background image, to produce a color and lighting harmonized output. For example, as illustrated, the lighting aware harmonization system 102 performs a first stage for lighting aware diffusion 500, a second stage for lighting alignment 502, and a third stage for finetuning 504.

In one or more embodiments, the lighting aware harmonization system 102 performs the first stage of lighting aware diffusion 500 to train a diffusion-based generative neural network and a lighting conditioning neural network in a joint training operation to condition the diffusion-based generative neural network on lighting features of a background image. For example, the lighting aware harmonization system 102 utilizes a pre-trained diffusion-based generative neural network to generate a digital image from a composite image. The lighting aware harmonization system 102 enables lighting awareness by attaching a lighting conditioning neural network (e.g., a lighting representation learning branch) to encode lighting information from a target background image and injecting the encoded information into the diffusion-based generative neural network backbone. In some embodiments, the lighting aware harmonization system 102 trains the diffusion-based generative neural network and lighting conditioning neural network utilizing a dataset with composite images including target background images during training.

The lighting aware harmonization system 102 performs the second stage of lighting alignment 502 to ensure that the lighting features extracted from a background by the lighting conditioning neural network align with lighting features corresponding to environment maps of background images. In one or more embodiments, the lighting aware harmonization system 102 enables lighting aware harmonization without relying on environment maps during inference by utilizing the lighting alignment 502 during training. For instance, the lighting aware harmonization system 102 adapts a lighting representation extracted from a target background image towards a learned representation of a corresponding environment map.

The lighting aware harmonization system 102 also performs the third stage of finetuning 504 via the use of a synthesis training dataset. In particular, the lighting aware harmonization system 102 finetunes the diffusion-based generative neural network (e.g., the backbone of the diffusion-based generative neural network) using high-quality pixel-aligned training pairs from natural images (e.g., photographs or other images observable in the real-world) including landscapes, indoor scenes, portraits, etc. Additionally in some embodiments, the lighting aware harmonization system 102 generates the synthesis training dataset utilizing the neural networks from the first stage and the second stage.

Figure 6:
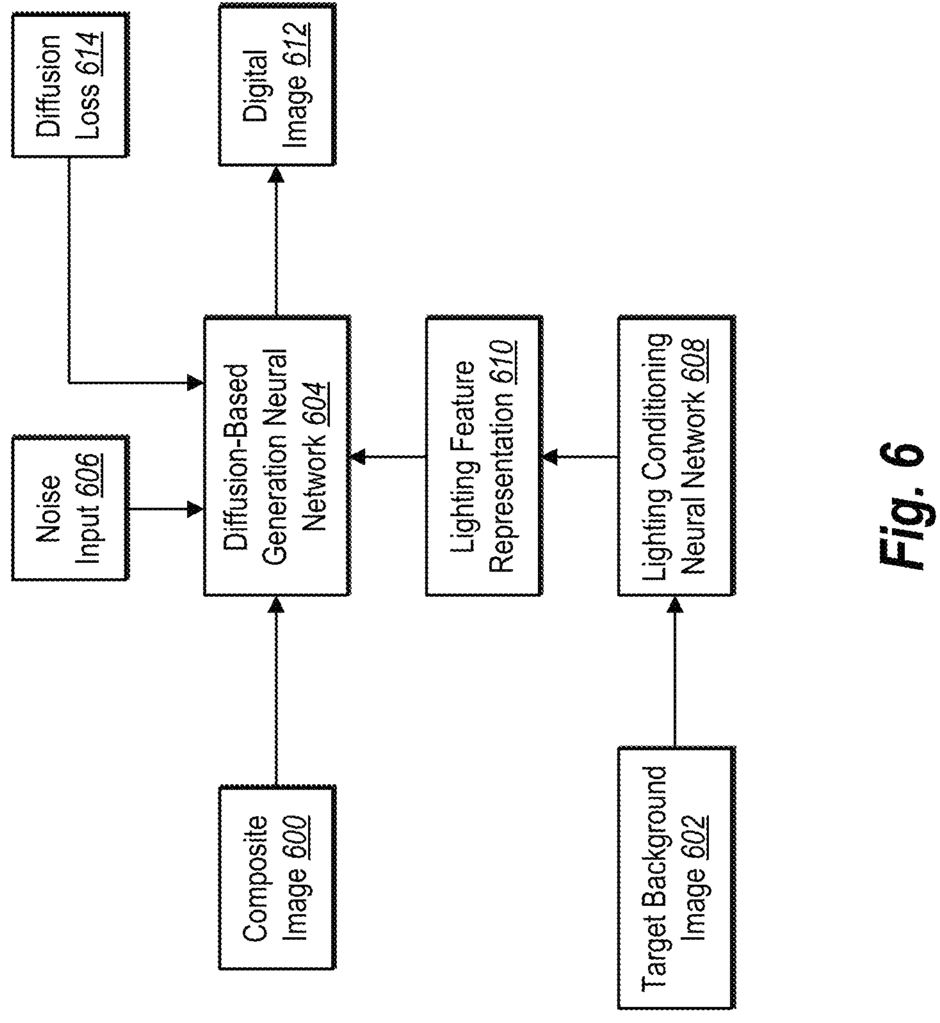
FIG. 6 illustrates a diagram of a first phase of a process to train a diffusion-based generative neural network with a lighting aware diffusion loss in accordance with one or more implementations.

As mentioned, the lighting aware harmonization system 102 performs a first stage of training including lighting aware diffusion. FIG. 6 illustrates a diagram of an embodiment of the lighting aware harmonization system 102 utilizing lighting aware diffusion to jointly train a diffusion-based generative neural network and a lighting conditioning neural network. In particular, the lighting aware harmonization system 102 utilizes a composite image with a target background image to train the neural networks based only on the composite image (including the target background image).

For instance, as illustrated in FIG. 6, the lighting aware harmonization system 102 determines a composite image 600, as described previously. Specifically, the composite image 600 includes a target background image 602 into which an object is inserted. Additionally, in some embodiments, the lighting aware harmonization system 102 determines the composite image 600 from a training dataset including a plurality of background images and environment maps. Furthermore, in some embodiments, the background images are generated from portions of the environment maps (e.g., by projecting the background images from the environment maps).

To illustrate, an environment map includes a set of mappings, such as reflection mappings, specular mappings, or other lighting effects that indicate texture coordinate values from vectors (e.g., normal, reflection vectors) rather than points. Accordingly, an environment map utilizes vectors to determine lighting conditions for locations in a digital image space for determining the impacts of lighting on objects in the digital image space. For example, an environment map includes an HDR map (e.g., a 360° mapping or a panoramic mapping) in which a single texture contains the image and the surroundings to incorporate lighting information with visual information for a digital image. In additional examples, an environment map includes an LDR (low dynamic range) map.

In one or more embodiments, the lighting aware harmonization system 102 provides the composite image 600 to a diffusion-based generative neural network 604 to perform a plurality of diffusion steps. Additionally, as illustrated, the lighting aware harmonization system 102 provides a noise input 606 to the diffusion-based generative neural network 604. More specifically, the lighting aware harmonization system 102 utilizes the noise input 606 to generate image content via a plurality of noising/denoising steps.

Furthermore, the lighting aware harmonization system 102 conditions the diffusion-based generative neural network 604 on lighting features of the target background image 602. In particular, the lighting aware harmonization system 102 forces the diffusion-based generative neural network 604 to perform the diffusion steps via a plurality of conditional feature maps based on the lighting features of the target background image 602. For example, as illustrated in FIG. 6, the lighting aware harmonization system 102 utilizes a lighting conditioning neural network 608 to extract a lighting feature representation 610 from the target background image 602. To illustrate, the lighting aware harmonization system 102 causes the diffusion-based generative neural network 604 to incorporate explicit lighting conditions (e.g., lighting directions/colors, as previously described) of the target background image 602 by generating the lighting feature representation 610 and injecting the lighting feature representation 610 into the diffusion-based generative neural network 604 at a plurality of different scales. In some embodiments, as mentioned, the lighting feature representation 610 includes the lighting feature representation 610 as conditional feature maps at respective resolutions within an encoder of the diffusion-based generative neural network 604.

As illustrated in FIG. 6, by conditioning the lighting aware harmonization system 102 on the lighting feature representation 610, the diffusion-based generative neural network 604 generates a digital image 612 with lighting awareness from the composite image 600. More specifically, the lighting aware harmonization system 102 jointly trains the diffusion-based generative neural network 604 and the lighting conditioning neural network 608 in a pairwise training process. For example, the lighting aware harmonization system 102 conditions the diffusion-based generative neural network 604 via a diffusion loss 614 according to a diffusion objective incorporating the lighting feature representation 610.

In one or more embodiments, as mentioned, the lighting aware harmonization system 102 generates a rendered image sample as $$x_i^a$$

indicating a portrait image (or object image) of subject i illuminated under the lighting condition a. The corresponding environment map is denoted as $$z_i^a,$$

and the lighting aware harmonization system 102 generates the background image $$y_i^a \text{ for } z_i^a$$

from projections of the environment map (e.g., an HDR map) with a specified field of view and resolution. Additionally, the lighting aware harmonization system 102 determines subject masks $m_i$ for the subjects i.

Additionally, in one or more embodiments, the lighting aware harmonization system 102 utilizes a lighting conditioning neural network $\mathcal{F}$ including a convolutional neural network to condition a diffusion-based generative neural network by injecting a lighting feature representation f encoded from the target background image at a plurality of scales. Specifically, the lighting aware harmonization system 102 utilizes a conditioning mechanism to add the lighting feature representation f at a plurality of resolutions within the encoder. Furthermore, in one or more embodiments, the lighting aware harmonization system 102 learns the lighting feature representation f from pairwise training, in which a training tuple from subject i is sampled as ($x^a$, m, $y^b$, $x^b$). Additionally, the lighting aware harmonization system 102 progressively adds noise to the target image $x^b$ until time step t, resulting in a noisy image $$x_t^b.$$

In one or more embodiments, the lighting aware harmonization system 102 conditions a diffusion-based generative neural network $\mathcal{U}_{bg}$ on a background-extracted lighting feature $\mathcal{F}_{bg}(y^b)$. Additionally, the lighting aware harmonization system 102 trains the diffusion-based generative neural network to predict the noise e with the following diffusion model objective:

$$\mathcal{L}_D = \mathbb{E}_{x^a, y^b, x_a^b, t, \epsilon}\left[\left\|\epsilon - \mathcal{U}_{bg}\left(x_t^b, t, x^a, \mathcal{F}_{bg}(y^b)\right)\right\|_2^2\right],$$

where $\epsilon \sim \mathcal{N}(0,1)$. Additionally, in some embodiments, the lighting aware harmonization system 102 initializes the weights of the diffusion-based generative neural network and jointly trains the diffusion-based generative neural network and lighting conditioning neural network.

Figure 7:
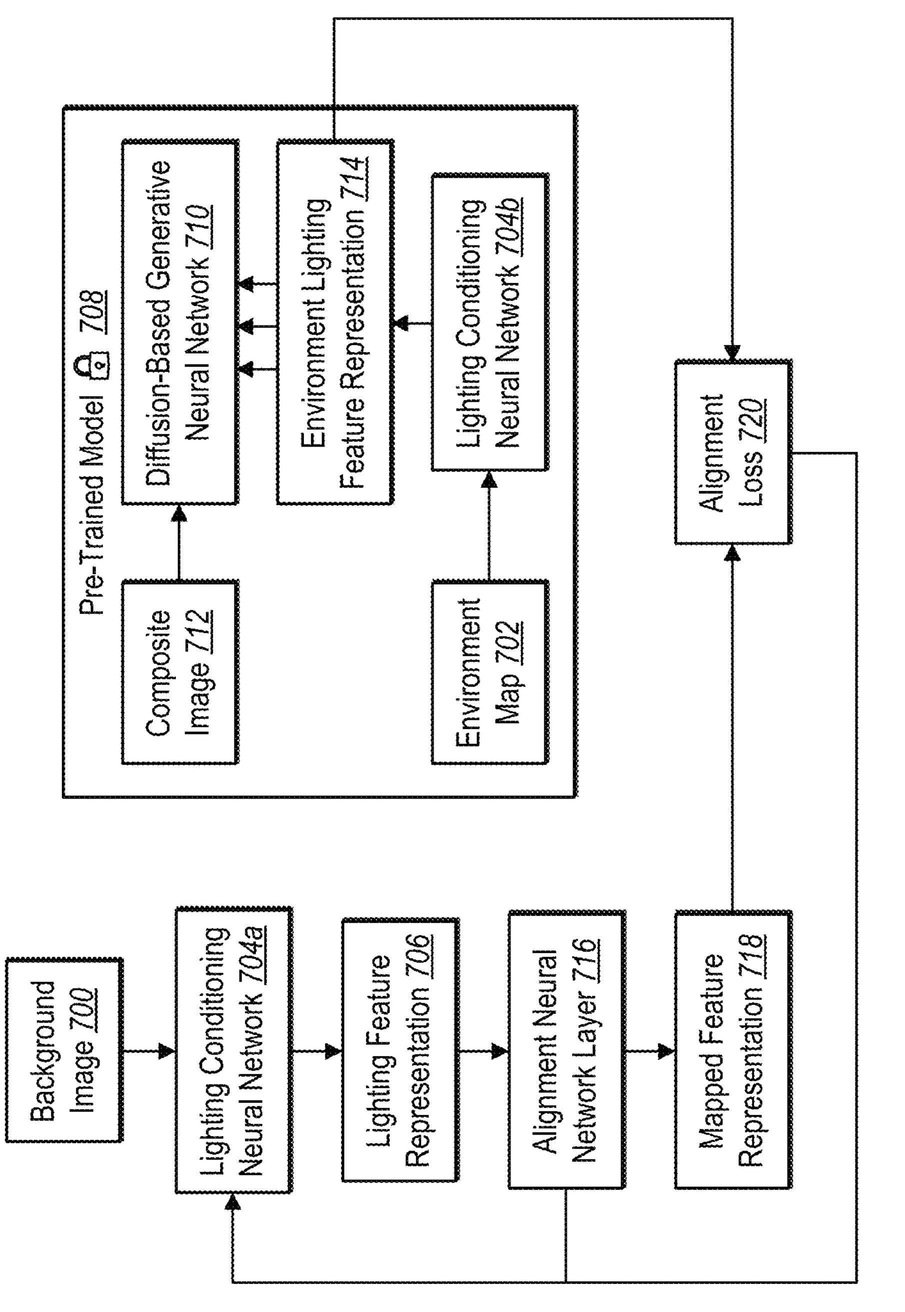
FIG. 7 illustrates a diagram of a second phase of a process to train a diffusion-based generative neural network with a lighting alignment loss in accordance with one or more implementations.

As mentioned, the lighting aware harmonization system 102 also provides lighting alignment between lighting features of background images and lighting features of corresponding environment maps. FIG. 7 illustrates an example of the lighting aware harmonization system 102 utilizing a training stage for lighting alignment for background images relative to environment maps. In particular, as previously mentioned, a training dataset for training a diffusion-based generative neural network includes background images generated by projecting portions of environment maps into an image space. Accordingly, the lighting aware harmonization system 102 utilizes the environment maps to improve performance of a lighting conditioning neural network in extracting lighting features from background images.

In one or more embodiments, the lighting aware harmonization system 102 determines a background image 700 and a corresponding environment map 702. Given that the background image is a partial projection of the environment map 702, which stores panoramic lighting information, the lighting aware harmonization system 102 uses cues from the environment map to train one or more neural networks to align the lighting features from the background image 700 with the lighting features from the environment map 702. Accordingly, aligning the lighting features extracted by the lighting aware harmonization system 102 improves flexibility by allowing the lighting aware harmonization system 102 to provide lighting aware image editing without the environment maps during inference.

As illustrated in FIG. 7, the lighting aware harmonization system 102 utilizes a lighting conditioning neural network 704*a* to generate a lighting feature representation 706 indicating lighting features of the background image 700. Additionally, the lighting aware harmonization system 102 utilizes a pre-trained model 708 including a plurality of neural networks with frozen parameters to extract lighting features from the environment map 702. For example, as illustrated in FIG. 7, the pre-trained model 708 includes a diffusion-based generative neural network 710 conditioned on the environment lighting features to generate lighting aware image content from a composite image 712 (e.g., including the background image 700). To illustrate, the pre-trained model 708 includes an additional lighting conditioning neural network 704*b* for generating an environment lighting feature representation 714 based on the environment map 702.

In one or more embodiments, the lighting aware harmonization system 102 utilizes the environment lighting feature representation 714 generated from the environment map 702 to modify parameters of the lighting conditioning neural network 704*a*. Specifically, the lighting aware harmonization system 102 utilizes an alignment neural network layer 716 to generate a mapped feature representation 718 from the lighting feature representation 706 of the background image 700. For instance, the lighting aware harmonization system 102 utilizes the alignment neural network layer 716 to calibrate the lighting feature representation 706 with the environment lighting feature representation 714. In at least some embodiments, the lighting aware harmonization system 102 formulates the alignment process as an inverse problem learned with the alignment neural network layer 716 under a supervised loss (i.e., alignment loss 720) based on differences between the lighting feature representation 706 and the environment lighting feature representation 714.

For example, in one or more embodiments, for the lighting feature representation $f_{bg}=\mathcal{F}_{bg}(y^b)$, the lighting aware harmonization system 102 also generates an environment lighting feature representation $f_{env}=\mathcal{F}_{env}(z^b)$ via the additional lighting conditioning neural network $\mathcal{F}_{env}$ on the environment map $z^b$. Additionally, the lighting aware harmonization system 102 freezes the pre-trained model 708 and introduces the alignment neural network layer $\mathcal{F}_{bg \rightarrow env}$ that calibrates the background-extracted lighting representation to align with the environment map-extracted lighting representation. To illustrate, for a training tuple $(x^a, m, y^b, z^b, x^b)$, the lighting aware harmonization system 102 takes the lighting feature representation $f_{bg}$ as the input and maps it to $f_{bg}*$ via the alignment neural network layer. The lighting aware harmonization system 102 utilizes the environment lighting feature representation $f_{env}$ as ground truth and determines a loss function (e.g., a $L_1$ objective) as follows:

$$f^* = \mathcal{F}_{bg \rightarrow env}(\mathcal{F}_{bg}(y^b))$$

$$\mathcal{L}_A = \mathbb{E}_{y^b, z^b}[\|\mathcal{F}_{env}(z^b) - f^*_{bg}\|_1].$$

In one or more embodiments, during the lighting alignment training stage, the lighting aware harmonization system 102 updates parameters of the lighting conditioning neural network 704*a* and the alignment neural network layer 716 while freezing the pre-trained model 708 and other networks (e.g., a diffusion-based generative neural network). The lighting aware harmonization system 102 utilizes the trained lighting conditioning neural network (aligned with the environment map lighting features) with a diffusion-based generative neural network $\mathcal{U}_{env}$ conditioned on the environment map as the final model architecture. Accordingly, the final model architecture includes the environment-conditioned diffusion-based generative neural network with a lighting conditioning neural network for extracting lighting features from background images only to generate lighting aware image content.

Figure 8:
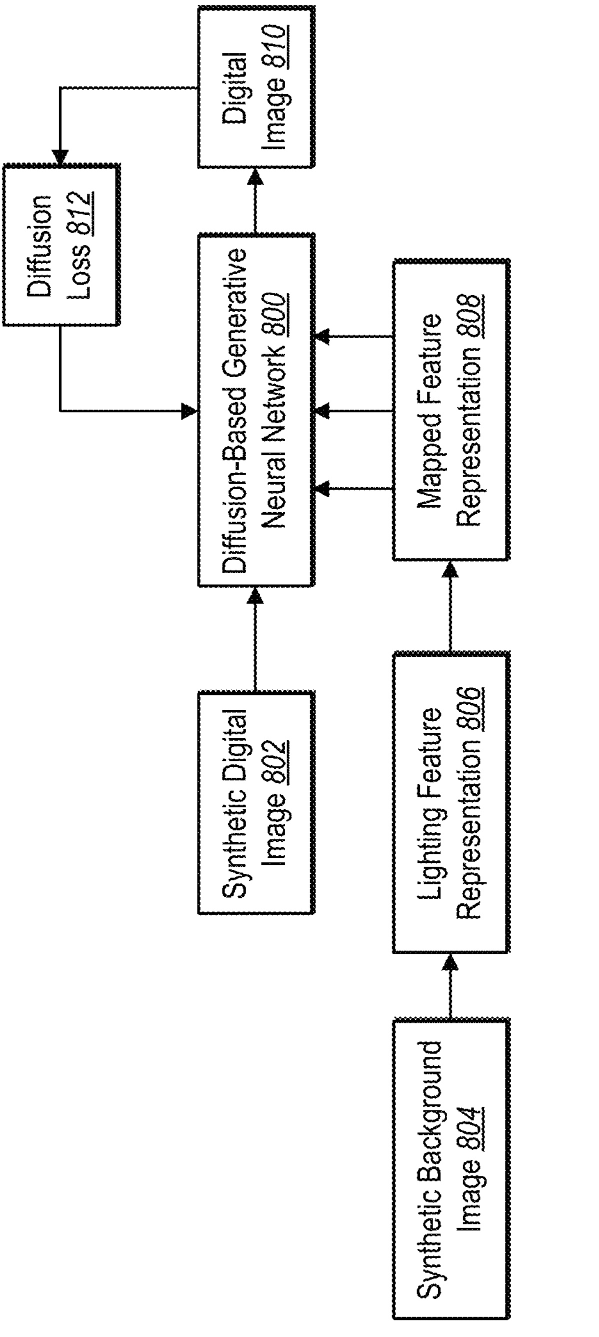
FIG. 8 illustrates a diagram of a third phase of a process to finetune a diffusion-based generative neural network utilizing a synthesis training dataset in accordance with one or more implementations.

FIG. 8 illustrates an example of a finetuning stage for training a diffusion-based generative neural network with a lighting conditioning neural network. Additionally, in some embodiments, the lighting aware harmonization system 102 utilizes one or more additional neural networks with frozen parameters to finetune/adjust the parameters of the diffusion-based generative neural network. Furthermore, as described in more detail with respect to FIG. 9, the lighting aware harmonization system 102 generates a synthesis training dataset for use in the finetuning stage.

As illustrated in FIG. 8, the lighting aware harmonization system 102 determines a diffusion-based generative neural network 800. In particular, in some embodiments, the lighting aware harmonization system 102 utilizes a diffusion-based generative neural network trained in conjunction with conditioning on environment map lighting features, as previously described with respect to FIG. 7. Accordingly, the lighting aware harmonization system 102 utilizes the environment conditioned diffusion-based generative neural network to generate lighting aware image content.

In one or more embodiments, the lighting aware harmonization system 102 utilizes a synthesis training dataset to train the diffusion-based generative neural network 800. For instance, the synthesis training dataset includes a synthetic digital image 802 and a synthetic background image 804. To illustrate, the lighting aware harmonization system 102 generates synthetic digital images including objects inserted into synthetic background images generated from natural images to provide a plurality of training pairs. Additionally, the lighting aware harmonization system 102 finetunes the parameters of the diffusion-based generative neural network 800 based on digital images generated from the synthetic images and the ground-truth (natural) images.

In particular, the lighting aware harmonization system 102 generates a lighting feature representation 806 from the synthetic background image 804. Specifically, the lighting aware harmonization system 102 utilizes a lighting conditioning neural network (e.g., the trained lighting conditioning neural network from the previous stage) to generate the lighting feature representation 806 representing lighting features in the synthetic background image 804. Furthermore, the lighting aware harmonization system 102 generates a mapped feature representation 808 utilizing the trained alignment neural network layer to align the lighting feature representation 806 as described previously. The lighting aware harmonization system 102 utilizes the mapped feature representation 808 to condition the diffusion-based generative neural network 800.

In at least some embodiments, the lighting aware harmonization system 102 utilizes the diffusion-based generative neural network 800 conditioned on the mapped feature representation 808 to generate a digital image 810 from the synthetic digital image 802 and a corresponding alpha mask). For example, the lighting aware harmonization system 102 generates the digital image 810 to include modified lighting values for a foreground object of the synthetic digital image 802 according to the extracted lighting features of the synthetic background image 804. Additionally, the lighting aware harmonization system 102 determines a diffusion loss 812 based on the digital image 810 for finetuning the parameters of the diffusion-based generative neural network 800 while freezing the lighting conditioning neural network and alignment neural network layer.

Figure 9:
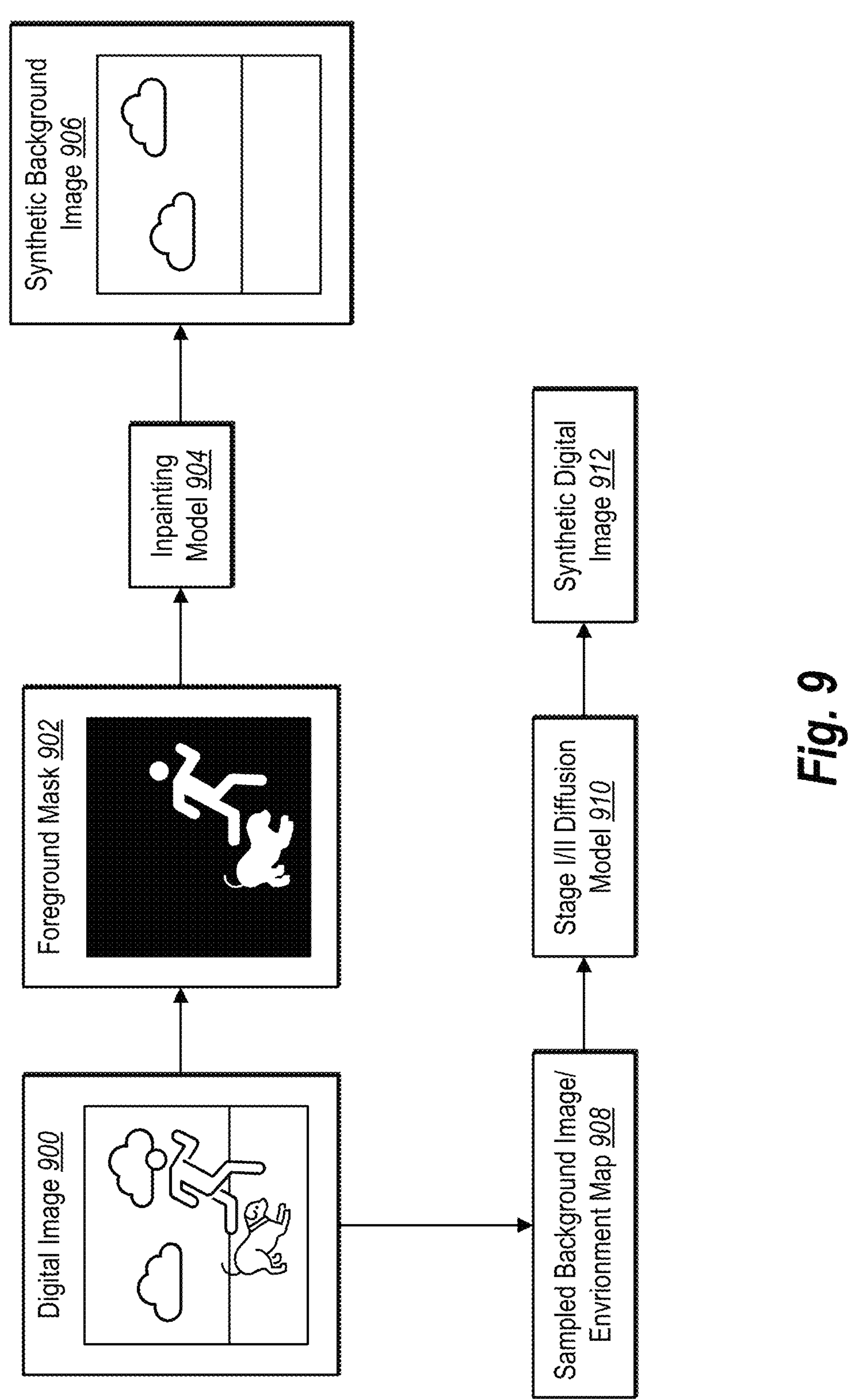
FIG. 9 illustrates a diagram of the lighting aware harmonization system generating a synthesis training dataset in accordance with one or more implementations.

As mentioned, FIG. 9 illustrates an example of the lighting aware harmonization system 102 generating a synthesis training dataset. In particular, the lighting aware harmonization system 102 uses a plurality of natural images as ground-truth images for generating the synthesis training dataset. In one or more embodiments, as illustrated, the lighting aware harmonization system 102 determines a digital image 900 from the plurality of natural images. For example, the digital image 900 includes one or more foreground objects against a background. In addition, the lighting aware harmonization system 102 determines one or more masks (e.g., a foreground mask 902) for the one or more foreground objects.

In connection with determining the digital image 900 and the foreground mask 902 for one or more objects, the lighting aware harmonization system 102 modifies the digital image 900 to remove the object(s) utilizing the foreground mask 902. Specifically, the lighting aware harmonization system 102 utilizes an inpainting model 904 to replace the object(s) with an inpainted region based on contextual information from the background of the digital image 900. For example, the lighting aware harmonization system 102 utilizes the inpainting model 904 to remove the object(s) and replace the object(s) with background portions by estimating the background behind the object(s) according to the contextual information. In some embodiments, the lighting aware harmonization system 102 also provides text guidance to influence the inpainting model 904 (e.g., "clear background"). As an example, the lighting aware harmonization system 102 utilizes a diffusion model with the text guidance to generate the inpainted region, as described by to Xie et al. in "SmartBrush: Text and Shape Guided Object Inpainting with Diffusion Model", CVPR (2023), which is herein incorporated by reference in its entirety. Accordingly, the lighting aware harmonization system 102 generates a synthetic background image 906 including the inpainted region.

Furthermore, in one or more embodiments, the lighting aware harmonization system 102 determines a sampled background image/environment map 908 from a dataset. The lighting aware harmonization system 102 utilizes the sampled background image/environment map 908 to alter the lighting of the foreground object(s) of the digital image 900. Specifically, the lighting aware harmonization system 102 utilizes a stage I/II diffusion model 910 (e.g., the trained diffusion-based generative neural network from FIG. 9) to generate a synthetic digital image 912 by inserting the foreground object(s) into the sampled background image/environment map 908 utilizing lighting awareness. The lighting aware harmonization system 102 thus generates the synthetic digital image 912 to provide as an input (e.g., with the foreground object(s) having modified lighting and the synthetic background image 906 as the target background image) to the diffusion-based generative neural network 800 of FIG. 8. Accordingly, the lighting aware harmonization system 102 generates a plurality of training pairs with synthetic digital images and synthetic background image as inputs and the natural images as ground-truths.

Figure 10A:
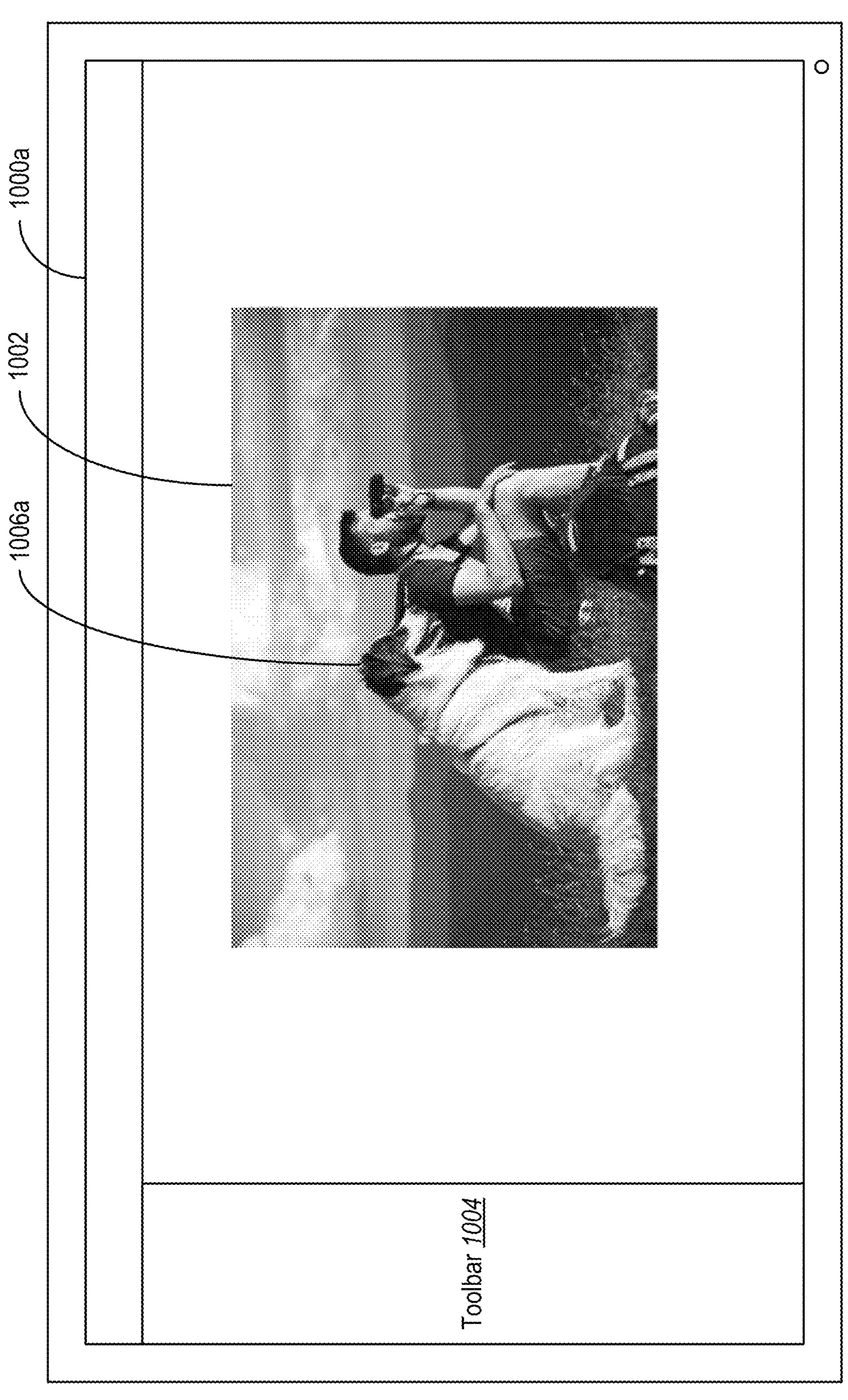
FIG. 10A illustrates a graphical user interface for initiating a request to edit a digital image utilizing the lighting aware harmonization system in accordance with one or more implementations.
Figure 10B:
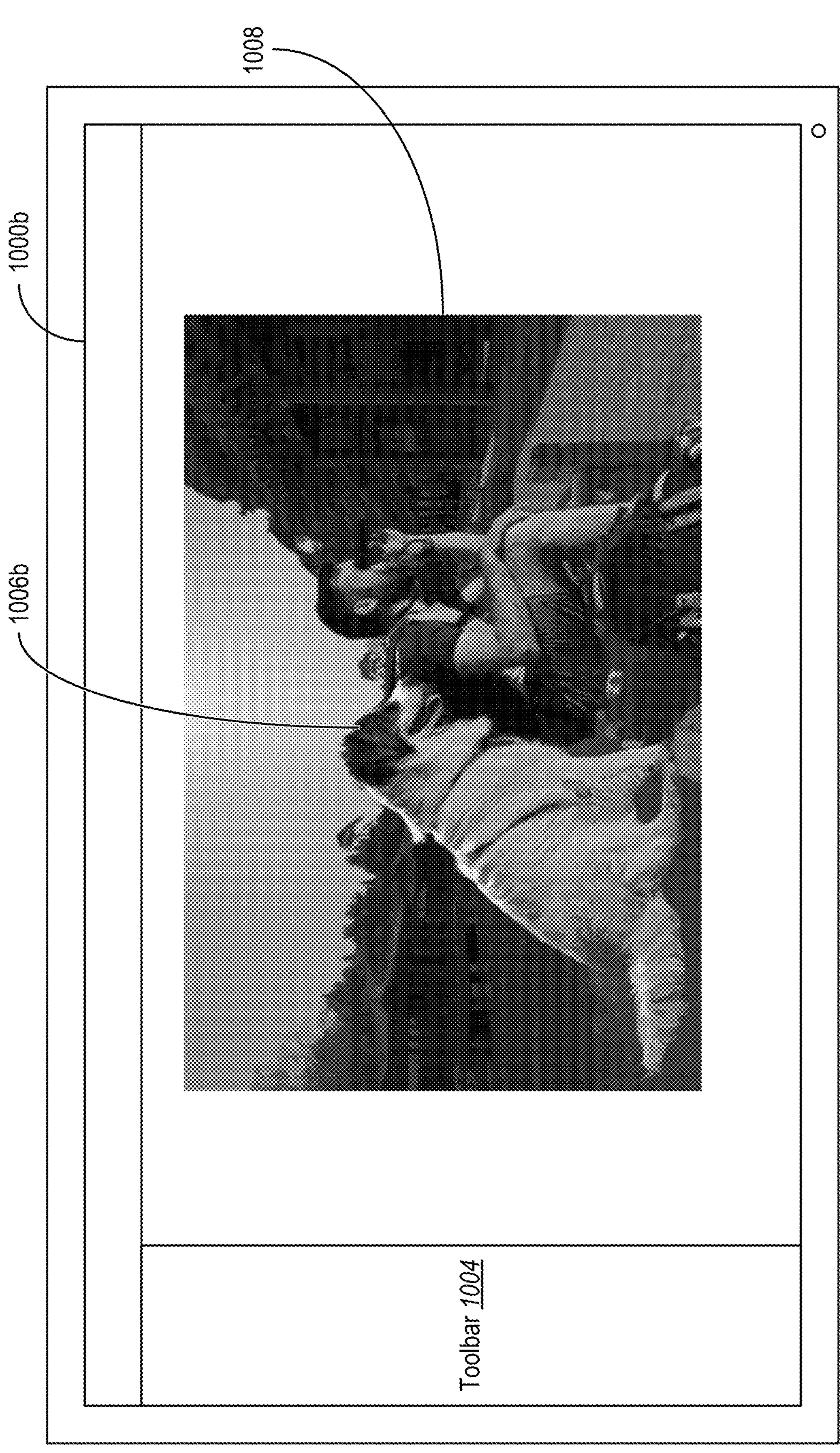
FIG. 10B illustrates a graphical user interface for displaying a digital image generated utilizing the lighting aware harmonization system in accordance with one or more implementations.

FIGS. 10A-10B illustrate example graphical user interfaces of an image editing application for performing lighting aware image editing of digital images. Specifically, FIG. 10A illustrates that a client device displays a graphical user interface 1000*a* of the image editing application for editing a digital image 1002. For example, the lighting aware harmonization system 102 includes a toolbar 1004 with tools to edit the digital image 1002. To illustrate, the toolbar 1004 (or another toolbar or menu) includes an option to select objects (e.g., via intelligent selection or manual selection). As an example, FIG. 10A illustrates that the client device determines a selection of one or more foreground objects (e.g., object 1006*a*) in the digital image 1002.

Additionally, the toolbar 1004 includes an option to generate a modified digital image by replacing a background of the digital image 1002 or to insert the object 1006*a* into a separate digital image. More specifically, the lighting aware harmonization system 102 determines a request to insert the object 1006*a* into a target background image (e.g., via a background replacement operation or a copy/paste operation). Accordingly, the lighting aware harmonization system 102 utilizes a diffusion-based generative neural network conditioned on lighting features extracted from the target background image to generate a modified digital image, as previously described.

FIG. 10B illustrates that the client device displays a graphical user interface 1000*b* including a modified digital image 1008 generated based on the digital image 1002 of FIG. 10A. In particular, as mentioned, the lighting aware harmonization system 102 generates the modified digital image 1008 by inserting the object 1006*a* into a target background image. Thus, the lighting aware harmonization system 102 utilizes the diffusion-based generative neural network conditioned on lighting features of the target background image to modify the lighting features of the object 1006*a*.

FIG. 10B illustrates a modified object 1006*b* including modified lighting features according to the lighting features of the target background image. For example, as shown, the modified object 1006*b* has lighting, coloring (e.g., tones), and shadows (e.g., self-occlusion shadows) consistent with the lighting features of the background. More specifically, the lighting aware harmonization system 102 generates the modified digital image 1008 to replicate the lighting direction, intensity, color, etc., of the target background image onto the modified object 1006*b*.

Figure 11:
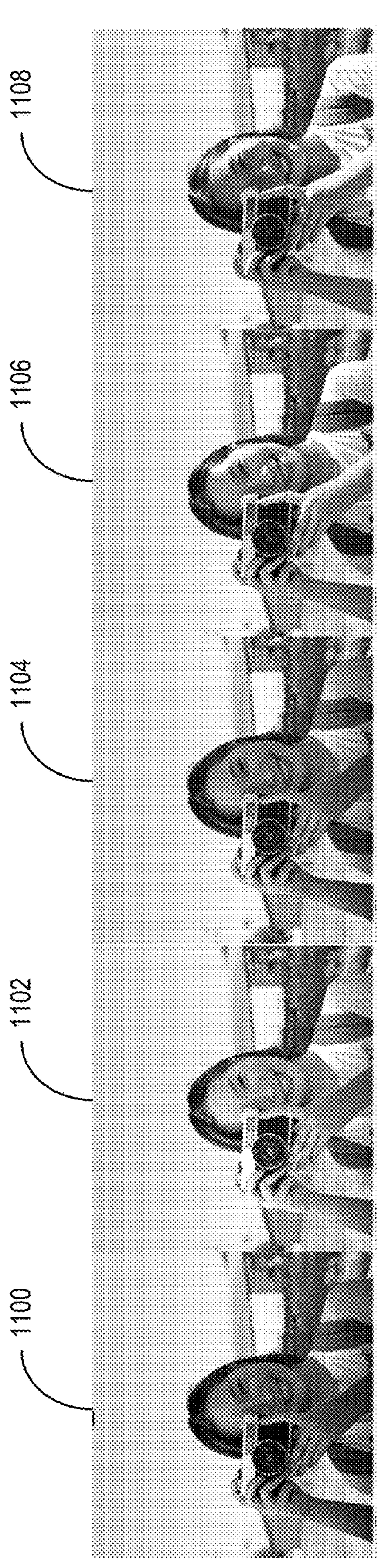
FIG. 11 illustrates a comparison of digital images in connection with inserting a foreground object into a background image in accordance with one or more implementations.

FIG. 11 illustrates a plurality of digital images for comparing performance of the lighting aware harmonization system 102 to a plurality of conventional systems. Specifically, FIG. 11 illustrates a composite image 1100 including an object with first lighting features inserted into a target background image with second lighting features based on a synthesis training dataset, as described in relation to FIG. 8. FIG. 11 also illustrates a first modified digital image 1102 generated by a first conventional harmonization system, a second modified digital image 1104 generated by a second conventional harmonization system, and a third modified digital image 1106 generated by the lighting aware harmonization system 102. Furthermore, FIG. 11 illustrates a ground-truth image 1108. As shown, the lighting aware harmonization system 102 provides better lighting and color harmonization relative to the ground-truth image 1108 than the conventional harmonization systems.

Figure 12:
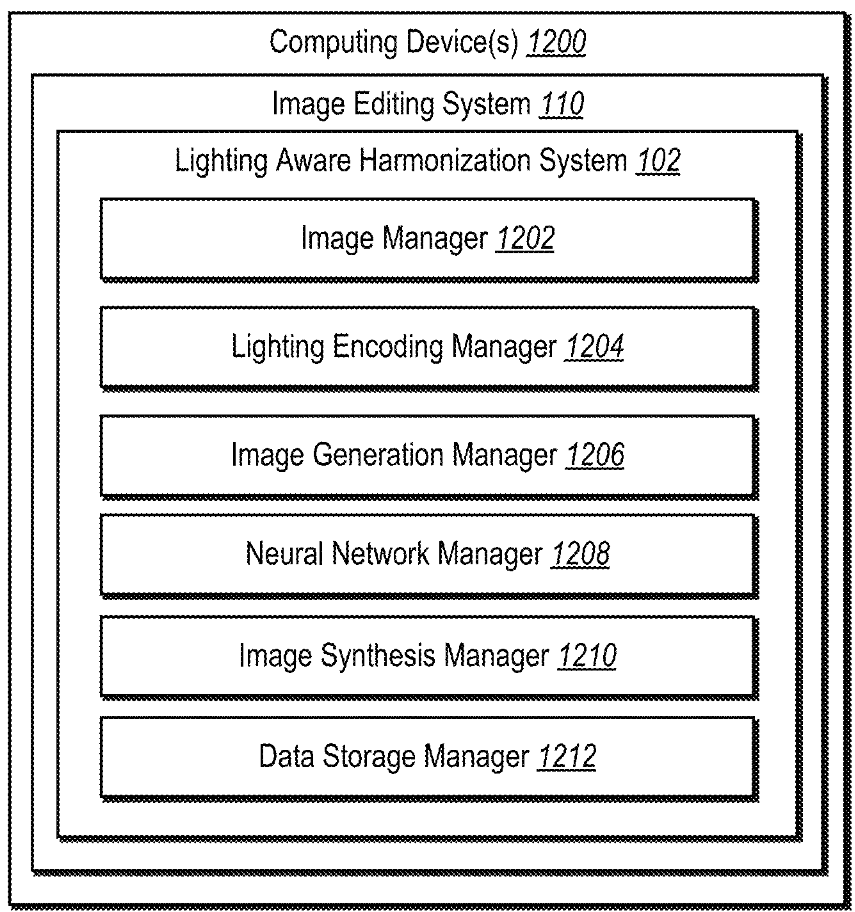
FIG. 12 illustrates a diagram of an example of the lighting aware harmonization system in accordance with one or more implementations.

FIG. 12 illustrates a detailed schematic diagram of an embodiment of the lighting aware harmonization system 102 described above. As shown, the lighting aware harmonization system 102 is implemented in an image editing system 110 on computing device(s) 1200 (e.g., a client device and/or server device as described in FIG. 1, and as further described below in relation to FIG. 15). Additionally, the lighting aware harmonization system 102 includes, but is not limited to, an image manager 1202, a lighting encoding manager 1204, an image generation manager 1206, a neural network manager 1208, an image synthesis manager 1210, and a data storage manager 1212. In one or more embodiments, the lighting aware harmonization system 102 is implemented on any number of computing devices. For example, the lighting aware harmonization system 102, in one or more embodiments, is implemented in a distributed system of server devices for digital image generation. Alternatively, the lighting aware harmonization system 102 is also implemented within one or more additional systems. For example, the lighting aware harmonization system 102, in one or more embodiments, is implemented on a single computing device such as a single client device.

In one or more embodiments, each of the components of the lighting aware harmonization system 102 is in communication with other components using any suitable communication technologies. Additionally, the components of the lighting aware harmonization system 102 are capable of being in communication with one or more other devices including other computing devices of a user, server devices (e.g., cloud storage devices), licensing servers, or other devices/systems. It will be recognized that although the components of the lighting aware harmonization system 102 are shown to be separate in FIG. 12, any of the subcomponents may be combined into fewer components, such as into a single component, or divided into more components as may serve a particular implementation. Furthermore, although the components of FIG. 12 are described in connection with the lighting aware harmonization system 102, at least some of the components for performing operations in conjunction with the lighting aware harmonization system 102 described herein may be implemented on other devices within the environment.

In some embodiments, the components of the lighting aware harmonization system 102 include software, hardware, or both. For example, the components of the lighting aware harmonization system 102 include one or more instructions stored on a computer-readable storage medium and executable by processors of one or more computing devices (e.g., the computing device(s) 1200). When executed by the one or more processors, the computer-executable instructions of the lighting aware harmonization system 102 cause the computing device(s) 1200 to perform the operations described herein. Alternatively, the components of the lighting aware harmonization system 102 include hardware, such as a special purpose processing device to perform a certain function or group of functions. Additionally, or alternatively, the components of the lighting aware harmonization system 102 include a combination of computer-executable instructions and hardware.

Furthermore, the components of the lighting aware harmonization system 102 performing the functions described herein with respect to the lighting aware harmonization system 102 may, for example, be implemented as part of a stand-alone application, as a module of an application, as a plug-in for applications, as a library function or functions that may be called by other applications, and/or as a cloud-computing model. Thus, the components of the lighting aware harmonization system 102 may be implemented as part of a stand-alone application on a personal computing device or a mobile device. Alternatively, or additionally, the components of the lighting aware harmonization system 102 may be implemented in any application that provides digital image difference captioning, including, but not limited to ADOBE® PHOTOSHOP® and ADOBE® CREATIVE CLOUD® software.

As illustrated, the lighting aware harmonization system 102 includes an image manager 1202 to manage digital images for image editing operations. In particular, the image manager 1202 accesses digital images for editing based on user inputs providing the digital images or accessing the digital images from a database of images. Additionally, the image manager 1202 manages target background images for replacing backgrounds in digital images with new backgrounds.

Additionally, the lighting aware harmonization system 102 includes a lighting encoding manager 1204 to encode lighting features of background images and environment maps. For example, the lighting encoding manager 1204 utilizes a lighting conditioning neural network to extract lighting features from a target background image. Additionally, the lighting encoding manager 1204 utilizes an environment lighting conditioning neural network to extract lighting features from an environment map, such as during training operations as previously described.

The lighting aware harmonization system 102 also includes a neural network manager 1208 to manage use and training of neural networks in lighting aware image editing operations. For example, the neural network manager 1208 manages the use of a diffusion-based generative neural network, a lighting conditioning neural network, and an alignment neural network layer during inference. Additionally, the neural network manager 1208 performs operations for training the neural networks.

The lighting aware harmonization system 102 also includes an image synthesis manager 1210 for generating synthesis training datasets. In particular, the image synthesis manager 1210 generates synthetic background images from digital images via the use of an inpainting model. The image synthesis manager 1210 also generates synthetic digital images from digital images by utilizing a lighting aware diffusion-based generative neural network to replace backgrounds in the digital images according to sampled background images/environment maps.

The lighting aware harmonization system 102 also includes a data storage manager 1212 (that comprises a non-transitory computer memory) that stores and maintains data associated with generating digital images with lighting awareness. For example, the data storage manager 1212 stores data associated with modifying object lighting in background replacement operations, including target background images and lighting feature representations. The data storage manager 1212 also stores data associated with training and utilizing various neural networks, including one or more diffusion-based generative neural networks, lighting conditioning neural networks, and alignment neural networks.

Figure 13:
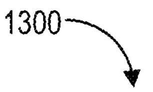
FIG. 13 illustrates a flowchart of a series of acts for generating a digital image utilizing a diffusion-based generative neural network conditioned on a lighting feature representation of a background image in accordance with one or more implementations.
Figure 13:
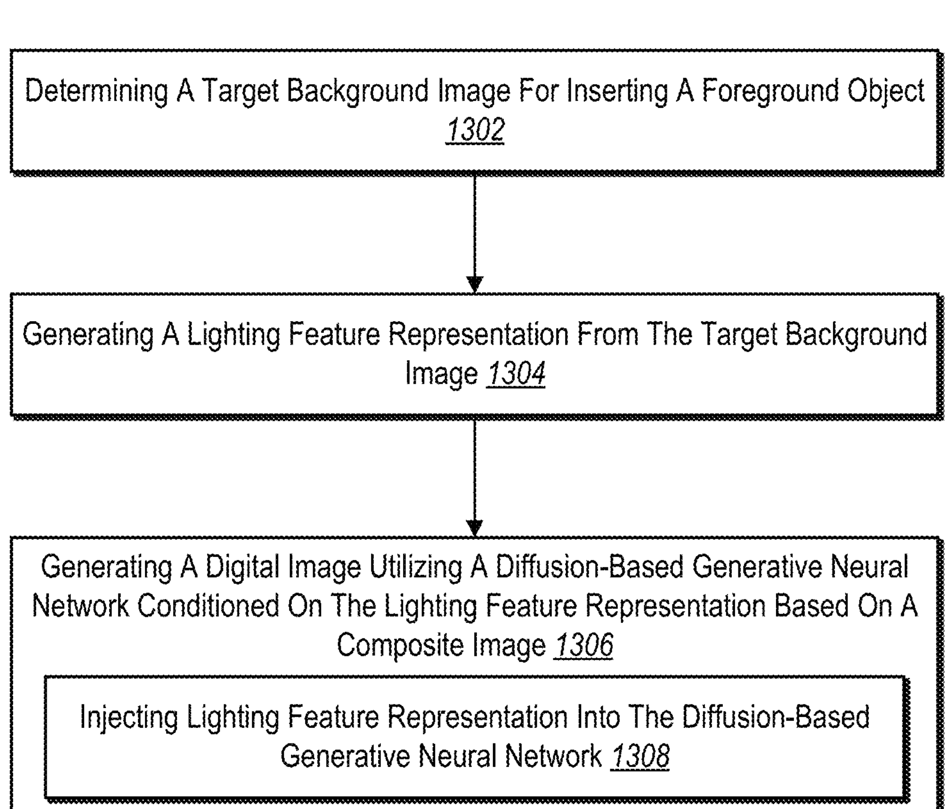

Turning now to FIG. 13, this figure shows a flowchart of a series of acts 1300 of generating a digital image utilizing a diffusion-based generative neural network conditioned on a lighting feature representation. While FIG. 13 illustrates acts according to one embodiment, alternative embodiments may omit, add to, reorder, and/or modify any of the acts shown in FIG. 13. The acts of FIG. 13 are part of a method. Alternatively, a non-transitory computer readable medium comprises instructions, that when executed by one or more processors, cause the one or more processors to perform the acts of FIG. 13. In still further embodiments, a system includes a processor or server configured to perform the acts of FIG. 13.

As shown, the series of acts 1300 includes an act 1302 of determining a target background image for inserting a foreground object. The series of acts 1300 also includes an act 1304 of generating a lighting feature representation from the target background image. Additionally, the series of acts 1300 includes an act 1306 of generating a digital image utilizing a diffusion-based generative neural network conditioned on the lighting feature representation based on a composite image. As illustrated, act 1306 includes a sub-act 1308 of injecting the lighting feature representation into the diffusion-based generative neural network.

In one or more embodiments, act 1302 involves determining, in response to a request to generate a digital image, a target background image for inserting a foreground object into the target background image. Act 1304 involves generating, from the target background image and utilizing a lighting conditioning neural network, a lighting feature representation indicating one or more lighting parameters of the target background image. Act 1306 involves generating, utilizing a diffusion-based generative neural network conditioned on the lighting feature representation, the digital image including the foreground object inserted into the target background image based on a composite image comprising the foreground object and the target background image with a foreground mask corresponding to the foreground object. Additionally, in some embodiments, sub-act 1308 involves injecting the lighting feature representation into the diffusion-based generative neural network by providing conditional feature maps corresponding to the lighting feature representation to a plurality of diffusion decoders of the diffusion-based generative neural network.

In one or more embodiments, the series of acts 1300 includes extracting the one or more lighting parameters from the target background image to an encoding space utilizing the lighting conditioning neural network.

In some embodiments, the series of acts 1300 further includes determining the target background image from a training tuple comprising a foreground image including the foreground object and the foreground mask, the target background image, and an environment map of the target background image. The series of acts 1300 also includes jointly modifying parameters of the lighting conditioning neural network and the diffusion-based generative neural network to reduce an output of a loss function based on a noise input and the digital image generated utilizing the diffusion-based generative neural network according to the training tuple.

In one or more embodiments, the series of acts 1300 includes generating, utilizing an environment lighting conditioning neural network, an environment lighting feature representation indicating one or more lighting parameters of the environment map of the target background image. The series of acts 1300 further includes modifying the parameters of the lighting conditioning neural network by comparing the lighting feature representation to the environment lighting feature representation.

In one or more embodiments, the series of acts 1300 includes generating the environment lighting feature representation utilizing the environment lighting conditioning neural network with the diffusion-based generative neural network. The series of acts 1300 further includes freezing the parameters of the environment lighting conditioning neural network and the diffusion-based generative neural network. The series of acts 1300 also includes modifying the parameters of the lighting conditioning neural network and parameters of a representation alignment neural network layer between the lighting conditioning neural network and the environment lighting conditioning neural network according to differences between the lighting feature representation and the environment lighting feature representation.

In one or more embodiments, the series of acts 1300 includes extracting an object from a training image according to an object mask. The series of acts 1300 further includes generating a synthetic background image by inpainting the training image to remove the object from the training image. The series of acts 1300 also includes generating a synthetic digital image comprising a modified version of the object inserted into an additional background image utilizing the diffusion-based generative neural network comprising parameters modified based on an environment lighting feature representation of an environment map of the additional background image.

In one or more embodiments, the series of acts 1300 includes generating, utilizing the lighting conditioning neural network, an additional lighting feature representation from the synthetic background image. Additionally, the series of acts 1300 includes generating, utilizing the diffusion-based generative neural network conditioned on the additional lighting feature representation, an additional digital image including the object inserted into the synthetic background image based on the modified version of the object in the synthetic digital image. The series of acts 1300 also includes modifying parameters of the diffusion-based generative neural network based on differences between the additional digital image and the training image.

In one or more embodiments, the series of acts 1300 includes jointly modifying parameters of the diffusion-based generative neural network and the lighting conditioning neural network to reduce an output of a loss function based on a noise input to the diffusion-based generative neural network and according to the lighting feature representation at a plurality of diffusion decoders of the diffusion-based generative neural network.

In one or more embodiments, the series of acts 1300 also includes determining an environment map of the target background image. Furthermore, the series of acts 1300 includes generating, utilizing an environment lighting conditioning neural network, an environment lighting feature representation from the environment map. The series of acts 1300 also includes determining, utilizing an alignment neural network layer, differences between the environment lighting feature representation and the lighting feature representation. Additionally, the series of acts 1300 includes modifying parameters of the lighting conditioning neural network or parameters of the alignment neural network layer to reduce the differences between the environment lighting feature representation and the lighting feature representation.

The series of acts 1300 further includes generating a synthesis training dataset comprising image tuples of training images, synthetic background images generated by inpainting over objects of the training images, and synthetic digital images generated by inserting the objects of the training images into additional background images utilizing the diffusion-based generative neural network. Additionally, the series of acts 1300 includes generating a plurality of digital images generated by: extracting modified versions of the objects from the synthetic digital images; and inserting the modified versions of the objects into the synthetic background images utilizing the diffusion-based generative neural network. The series of acts 1300 also includes modifying parameters of the diffusion-based generative neural network to reduce an output of a loss function that determines differences between the training images and the plurality of digital images.

Figure 14:
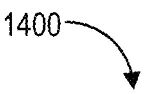
FIG. 14 illustrates a flowchart of a series of acts for training a diffusion-based generative neural network conditioned on a lighting feature representation of a background image in accordance with one or more implementations.
Figure 14:
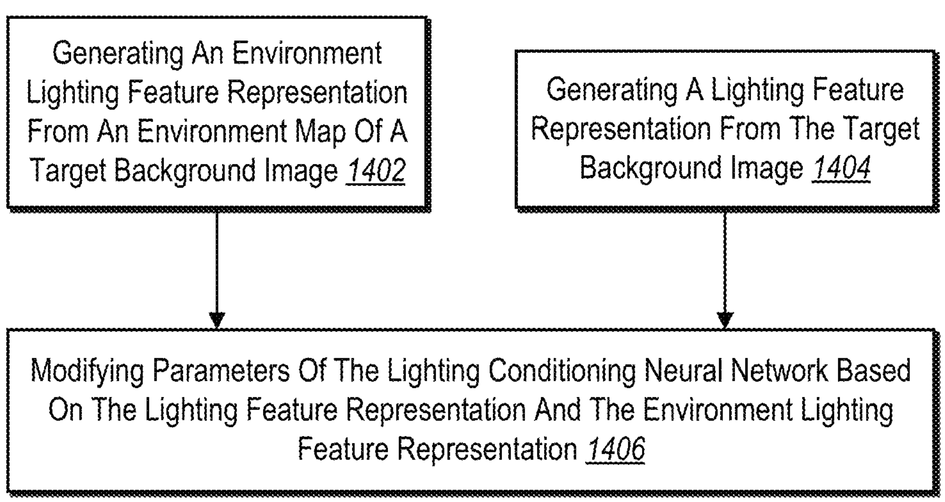

Turning now to FIG. 14, this figure shows a flowchart of a series of acts 1400 of training a diffusion-based generative neural network conditioned on a lighting feature representation of a background image. While FIG. 14 illustrates acts according to one embodiment, alternative embodiments may omit, add to, reorder, and/or modify any of the acts shown in FIG. 14. The acts of FIG. 14 are part of a method. Alternatively, a non-transitory computer readable medium comprises instructions, that when executed by one or more processors, cause the one or more processors to perform the acts of FIG. 14. In still further embodiments, a system includes a processor or server configured to perform the acts of FIG. 14.

As shown, the series of acts 1400 includes an act 1402 of generating an environment lighting feature representation from an environment map of a target background image. The series of acts 1400 also includes an act 1404 of generating a lighting feature representation from the target background image. The series of acts 1400 also includes an act 1406 of modifying parameters of the lighting conditioning neural network based on the lighting feature representation and the environment lighting feature representation.

In one or more embodiments, the series of acts 1400 includes determining a training tuple comprising a foreground image including a foreground object, the target background image, and the environment map corresponding to the target background image. Additionally, the series of acts 1400 includes generating the environment lighting feature representation from the environment map utilizing the environment lighting conditioning neural network with frozen parameters in connection with generating a digital image utilizing a diffusion-based generative neural network conditioned on the environment lighting feature representation.

In one or more embodiments, the series of acts 1400 includes generating, utilizing the lighting conditioning neural network with modifiable parameters, the lighting feature representation from the target background image of the training tuple. Additionally, the series of acts 1400 includes determining the differences between the lighting feature representation and the environment lighting feature representation utilizing an alignment neural network layer between the lighting conditioning neural network and the environment lighting conditioning neural network. The series of acts 1400 also includes modifying the parameters of the lighting conditioning neural network and parameters of the alignment neural network layer to reduce the differences between the lighting feature representation and the environment lighting feature representation.

In one or more embodiments, the series of acts 1400 includes generating, utilizing a diffusion-based generative neural network conditioned on the lighting feature representation, a digital image including the foreground object inserted into the target background image based on a composite image comprising the foreground object and the target background image with a foreground mask corresponding to the foreground object. The series of acts 1400 also includes jointly modifying the parameters of the lighting conditioning neural network and parameters of the diffusion-based generative neural network to reduce an output of a loss function based on a noise input and the digital image.

In additional embodiments, the series of acts 1400 includes generating a synthesis training dataset comprising a plurality of training images, a plurality of synthetic background images comprising inpainted backgrounds from the plurality of training images, and a plurality of synthetic digital images generated by inserting objects of the plurality of training images inserted into additional background images utilizing the diffusion-based generative neural network. The series of acts 1400 also includes modifying parameters of the diffusion-based generative neural network to reduce differences between the plurality of training images and a plurality of digital images generated by the diffusion-based generative neural network from the plurality of synthetic digital images.

In some embodiments, the series of acts 1400 includes extracting an object from a training image of the plurality of training images according to an object mask. The series of acts 1400 further includes generating a synthetic background image of the plurality of synthetic background images by inpainting the training image to remove the object from the training image. Additionally, the series of acts 1400 includes generating a synthetic digital image of the plurality of synthetic digital images comprising a modified version of the object inserted into an additional background image with modified color values utilizing the diffusion-based generative neural network.

In some embodiments, the series of acts 1400 includes determining, from a request to generate a digital image, an object from an input image to insert into a selected background image. The series of acts 1400 also includes generating, utilizing the lighting conditioning neural network with modified parameters, an additional lighting feature representation indicating lighting parameters of the selected background image in an encoding space. The series of acts 1400 also includes generating, utilizing a diffusion-based generative neural network conditioned on the additional lighting feature representation of the selected background image, the digital image comprising a modified version of the object within the selected background image with modified color values according to the lighting parameters of the selected background image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
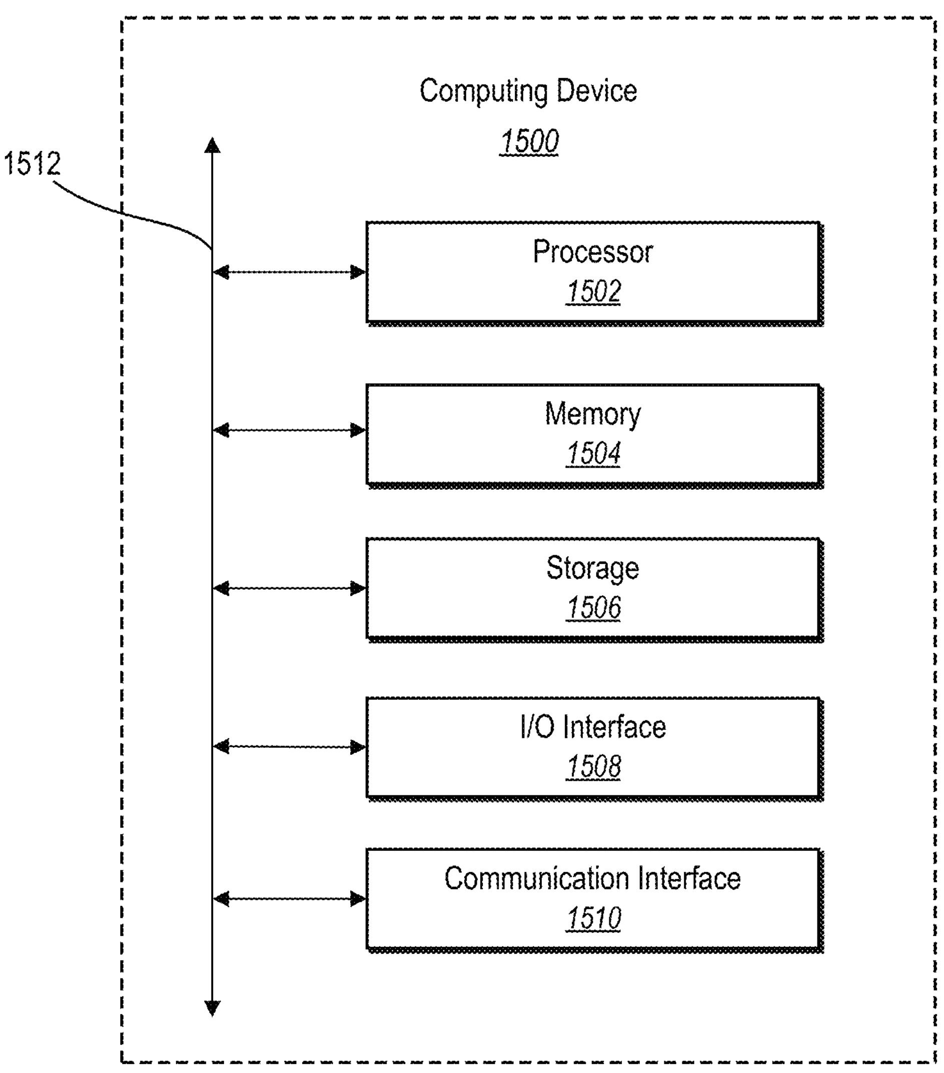
FIG. 15 illustrates a block diagram of an exemplary computing device in accordance with one or more implementations.

FIG. 15 illustrates a block diagram of exemplary computing device 1500 that may be configured to perform one or more of the processes described above. One will appreciate that one or more computing devices such as the computing device 1500 may implement the system(s) of FIG. 1. As shown by FIG. 15, the computing device 1500 can comprise a processor 1502, a memory 1504, a storage device 1506, an I/O interface 1508, and a communication interface 1510, which may be communicatively coupled by way of a communication infrastructure 1512. In certain embodiments, the computing device 1500 can include fewer or more components than those shown in FIG. 15. Components of the computing device 1500 shown in FIG. 15 will now be described in additional detail.

In one or more embodiments, the processor 1502 includes hardware for executing instructions, such as those making up a computer program. As an example, and not by way of limitation, to execute instructions for dynamically modifying workflows, the processor 1502 may retrieve (or fetch) the instructions from an internal register, an internal cache, the memory 1504, or the storage device 1506 and decode and execute them. The memory 1504 may be a volatile or non-volatile memory used for storing data, metadata, and programs for execution by the processor(s). The storage device 1506 includes storage, such as a hard disk, flash disk drive, or other digital storage device, for storing data or instructions for performing the methods described herein.

The I/O interface 1508 allows a user to provide input to, receive output from, and otherwise transfer data to and receive data from computing device 1500. The I/O interface 1508 may include a mouse, a keypad or a keyboard, a touch screen, a camera, an optical scanner, network interface, modem, other known I/O devices or a combination of such I/O interfaces. The I/O interface 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1508 is configured to provide graphical data to a display for presentation to a user. The graphical data may be representative of one or more graphical user interfaces and/or any other graphical content as may serve a particular implementation.

The communication interface 1510 can include hardware, software, or both. In any event, the communication interface 1510 can provide one or more interfaces for communication (such as, for example, packet-based communication) between the computing device 1500 and one or more other computing devices or networks. As an example, and not by way of limitation, the communication interface 1510 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1510 may facilitate communications with various types of wired or wireless networks. The communication interface 1510 may also facilitate communications using various communication protocols. The communication infrastructure 1512 may also include hardware, software, or both that couples components of the computing device 1500 to each other. For example, the communication interface 1510 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:

determining, in response to a request to generate a digital image, a target background image for inserting a foreground object into the target background image;

generating, from the target background image and utilizing a lighting conditioning neural network, a lighting feature representation comprising an encoding of one or more lighting features corresponding to one or more light sources of the target background image; and generating, utilizing a diffusion-based generative neural network conditioned on the lighting feature representation by injecting the lighting feature representation as conditional feature maps at a plurality of resolutions within the diffusion-based generative neural network, the digital image including the foreground object inserted into the target background image based on a composite image comprising the foreground object and the target background image with a foreground mask corresponding to the foreground object.

2. The computer-implemented method of claim 1, wherein generating the lighting feature representation comprises:

extracting the one or more lighting features corresponding to the one or more light sources from the target background image; and encoding the one or more lighting features, as feature vectors representing image content, into an encoding space utilizing the lighting conditioning neural network.

3. The computer-implemented method of claim 1, wherein generating the digital image comprises injecting the lighting feature representation into the diffusion-based generative neural network by providing the conditional feature maps corresponding to the lighting feature representation to a plurality of diffusion decoders of the diffusion-based generative neural network.

4. The computer-implemented method of claim 1, further comprising:

determining the target background image from a training tuple comprising a foreground image including the foreground object and the foreground mask, the target background image, and an environment map of the target background image; and jointly modifying parameters of the lighting conditioning neural network and the diffusion-based generative neural network to reduce an output of a loss function based on a noise input and the digital image generated utilizing the diffusion-based generative neural network according to the training tuple.

5. The computer-implemented method of claim 4, further comprising:

generating, utilizing an environment lighting conditioning neural network, an environment lighting feature representation indicating one or more lighting parameters of the environment map of the target background image; and modifying the parameters of the lighting conditioning neural network by comparing the lighting feature representation to the environment lighting feature representation.

6. The computer-implemented method of claim 5, wherein:

generating the environment lighting feature representation utilizing the environment lighting conditioning neural network with the diffusion-based generative neural network;

freezing the parameters of the environment lighting conditioning neural network and the diffusion-based generative neural network; and modifying the parameters of the lighting conditioning neural network and parameters of a representation alignment neural network layer between the lighting conditioning neural network and the environment lighting conditioning neural network according to differences between the lighting feature representation and the environment lighting feature representation.

7. The computer-implemented method of claim 1, further comprising generating a synthesis training dataset for modifying the diffusion-based generative neural network by:

extracting an object from a training image according to an object mask;

generating a synthetic background image by inpainting the training image to remove the object from the training image; and generating a synthetic digital image comprising a modified version of the object inserted into an additional background image utilizing the diffusion-based generative neural network comprising parameters modified based on an environment lighting feature representation of an environment map of the additional background image.

8. The computer-implemented method of claim 7, further comprising modifying the diffusion-based generative neural network by:

generating, utilizing the lighting conditioning neural network, an additional lighting feature representation from the synthetic background image;

generating, utilizing the diffusion-based generative neural network conditioned on the additional lighting feature representation, an additional digital image including the object inserted into the synthetic background image based on the modified version of the object in the synthetic digital image; and modifying the parameters of the diffusion-based generative neural network based on differences between the additional digital image and the training image.

9. The computer-implemented method of claim 1, further comprising:

generating a synthesis training dataset comprising image tuples of training images, synthetic background images generated by inpainting over objects of the training images, and synthetic digital images generated by inserting the objects of the training images into additional background images utilizing the diffusion-based generative neural network;

generating a plurality of digital images generated by:

extracting modified versions of the objects from the synthetic digital images; and inserting the modified versions of the objects into the synthetic background images utilizing the diffusion-based generative neural network; and modifying parameters of the diffusion-based generative neural network to reduce an output of a loss function that determines differences between the training images and the plurality of digital images.

10. A system comprising:

one or more memory devices; and one or more processors coupled to the one or more memory devices that cause the system to perform operations comprising:

generating, utilizing an environment lighting conditioning neural network, an environment lighting feature representation from an environment map corresponding to a target background image, wherein the environment lighting feature representation comprises a first encoding of one or more lighting features of the environment map;

generating, utilizing a lighting conditioning neural network, a lighting feature representation from the target background image, wherein the lighting feature representation comprises a second encoding of one or more lighting features of the target background image; and modifying parameters of the lighting conditioning neural network by:

determining an alignment loss based on differences between the lighting feature representation and the environment lighting feature representation in an encoding space; and updating the parameters of the lighting conditioning neural network to reduce the alignment loss by aligning the lighting feature representation with the environment lighting feature representation in the encoding space.

11. The system of claim 10, wherein generating the environment lighting feature representation comprises:

determining a training tuple comprising a foreground image including a foreground object, the target background image, and the environment map corresponding to the target background image; and generating the environment lighting feature representation from the environment map utilizing the environment lighting conditioning neural network with frozen parameters in connection with generating a digital image utilizing a diffusion-based generative neural network conditioned on the environment lighting feature representation.

12. The system of claim 11, wherein generating the lighting feature representation comprises generating, utilizing the lighting conditioning neural network with modifiable parameters, the lighting feature representation from the target background image of the training tuple.

13. The system of claim 12, wherein modifying the parameters of the lighting conditioning neural network comprises:

determining the differences between the lighting feature representation and the environment lighting feature representation utilizing an alignment neural network layer between the lighting conditioning neural network and the environment lighting conditioning neural network; and modifying the parameters of the lighting conditioning neural network and parameters of the alignment neural network layer to reduce the differences between the lighting feature representation and the environment lighting feature representation.

14. The system of claim 11, further comprising:

generating, utilizing the diffusion-based generative neural network conditioned on the lighting feature representation by injecting the lighting feature representation as conditional feature maps at a plurality of resolutions within the diffusion-based generative neural network, the digital image including the foreground object inserted into the target background image based on a composite image comprising the foreground object and the target background image with a foreground mask corresponding to the foreground object; and jointly modifying the parameters of the lighting conditioning neural network and parameters of the diffusion-based generative neural network to reduce an output of a loss function based on a noise input and the digital image.

15. The system of claim 10, further comprising modifying parameters of a diffusion-based generative neural network conditioned on the environment lighting feature representation of the target background image by:

generating a synthesis training dataset comprising a plurality of training images, a plurality of synthetic background images comprising inpainted backgrounds from the plurality of training images, and a plurality of synthetic digital images generated by inserting objects of the plurality of training images inserted into additional background images utilizing the diffusion-based generative neural network; and modifying the parameters of the diffusion-based generative neural network to reduce differences between the plurality of training images and a plurality of digital images generated by the diffusion-based generative neural network from the plurality of synthetic digital images.

16. The system of claim 15, wherein generating the synthesis training dataset comprises:

extracting an object from a training image of the plurality of training images according to an object mask;

generating a synthetic background image of the plurality of synthetic background images by inpainting the training image to remove the object from the training image; and generating a synthetic digital image of the plurality of synthetic digital images comprising a modified version of the object inserted into an additional background image with modified color values utilizing the diffusion-based generative neural network.

17. The system of claim 10, wherein further comprising:

determining, from a request to generate a digital image, an object from an input image to insert into a selected background image;

generating, utilizing the lighting conditioning neural network with modified parameters, an additional lighting feature representation indicating lighting parameters of the selected background image in the encoding space; and generating, utilizing a diffusion-based generative neural network conditioned on the additional lighting feature representation of the selected background image, the digital image comprising a modified version of the object within the selected background image with modified color values according to the lighting parameters of the selected background image.

18. A non-transitory computer-readable medium storing instructions thereon that, when executed by at least one processor, cause the at least one processor to perform operations comprising:

determining, in response to a request to generate a digital image, a target background image for inserting a foreground object into the target background image;

generating, from the target background image and utilizing a lighting conditioning neural network, a lighting feature representation comprising an encoding of one or more lighting features corresponding to one or more light sources of the target background image; and generating, utilizing a diffusion-based generative neural network conditioned on the lighting feature representation by injecting the lighting feature representation as conditional feature maps at a plurality of resolutions within the diffusion-based generative neural network, the digital image including the foreground object inserted into the target background image based on a composite image comprising the foreground object and the target background image, a foreground mask corresponding to the foreground object.

19. The non-transitory computer-readable medium of claim 18, wherein the operations further comprise jointly modifying parameters of the diffusion-based generative neural network and the lighting conditioning neural network to reduce an output of a loss function based on a noise input to the diffusion-based generative neural network and according to the lighting feature representation at a plurality of diffusion decoders of the diffusion-based generative neural network.

20. The non-transitory computer-readable medium of claim 18, wherein the operations further comprise:

determining an environment map of the target background image;

generating, utilizing an environment lighting conditioning neural network, an environment lighting feature representation from the environment map;

determining, utilizing an alignment neural network layer, differences between the environment lighting feature representation and the lighting feature representation; and modifying parameters of the lighting conditioning neural network or parameters of the alignment neural network layer to reduce the differences between the environment lighting feature representation and the lighting feature representation.

* * * * *